April 17, 1956 H. ALFANDRE 2,742,205
BUCKLE THREADING APPARATUS
Filed Sept. 15, 1951 11 Sheets-Sheet 1

INVENTOR.
HARRY ALFANDRE
BY Edwin Lewisohn &
Harry Cohen
ATTORNEYS

April 17, 1956 H. ALFANDRE 2,742,205
BUCKLE THREADING APPARATUS
Filed Sept. 15, 1951 11 Sheets-Sheet 3

INVENTOR.
HARRY ALFANDRE
BY Edwin Lenroth &
Harry Cohen
ATTORNEYS

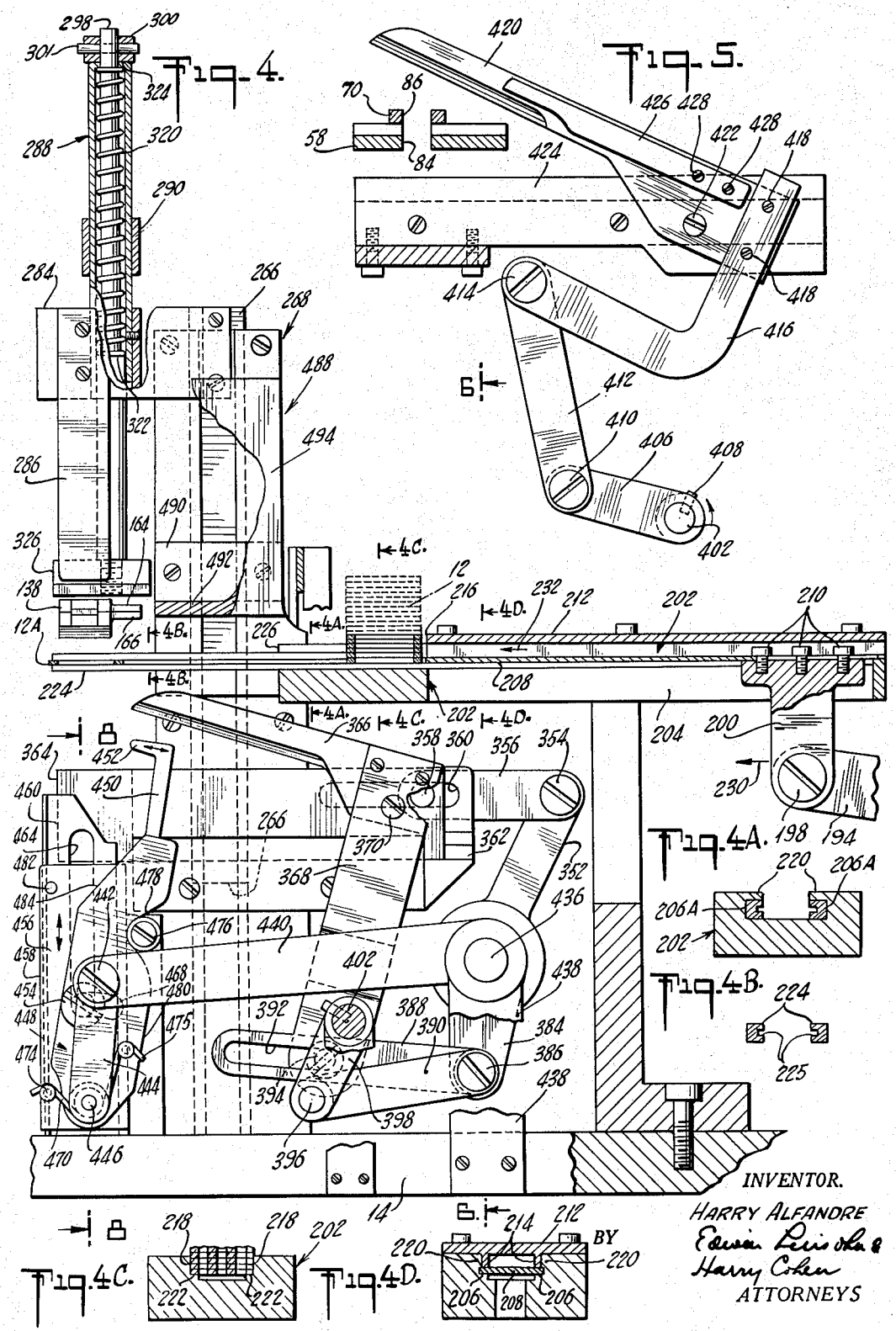

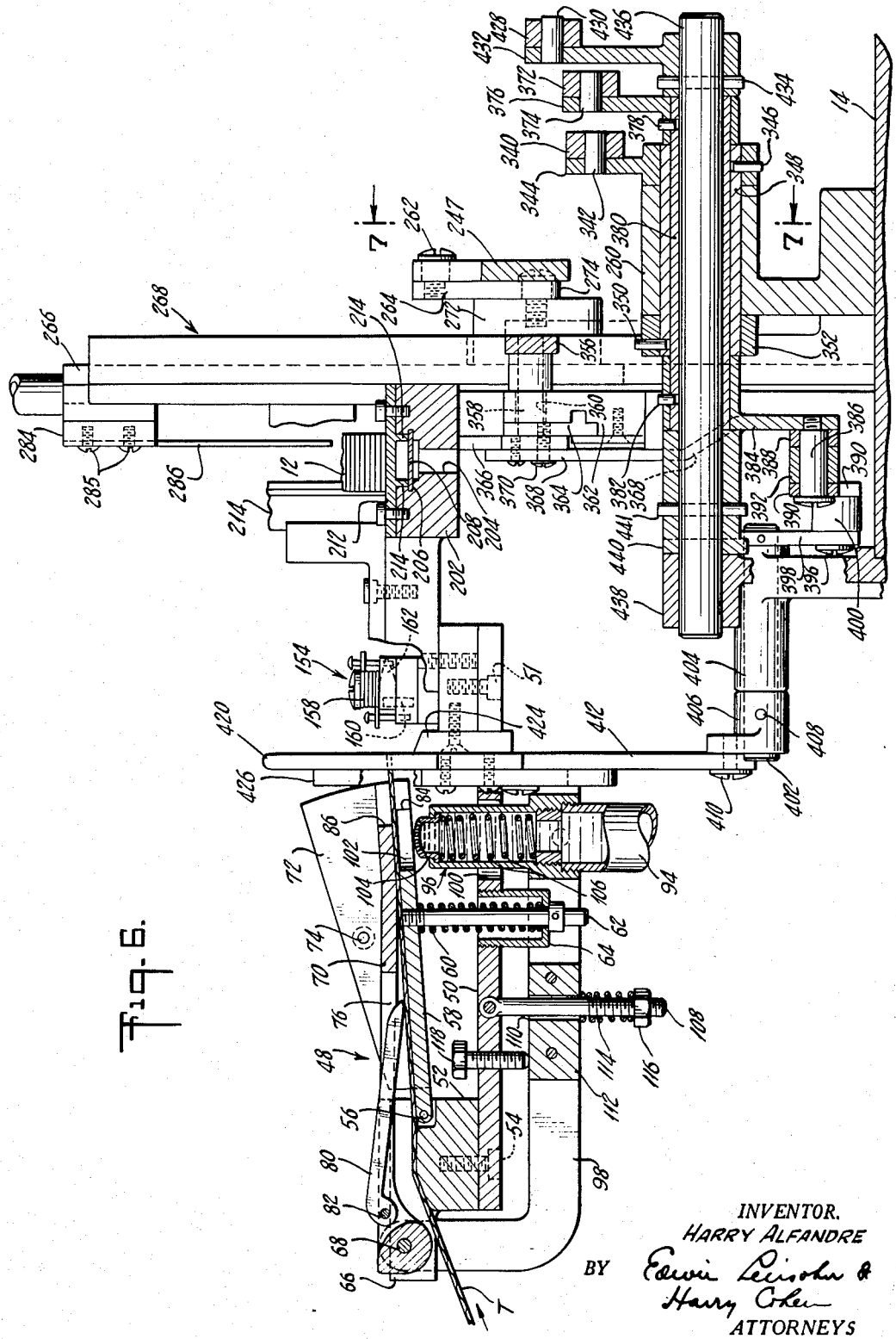

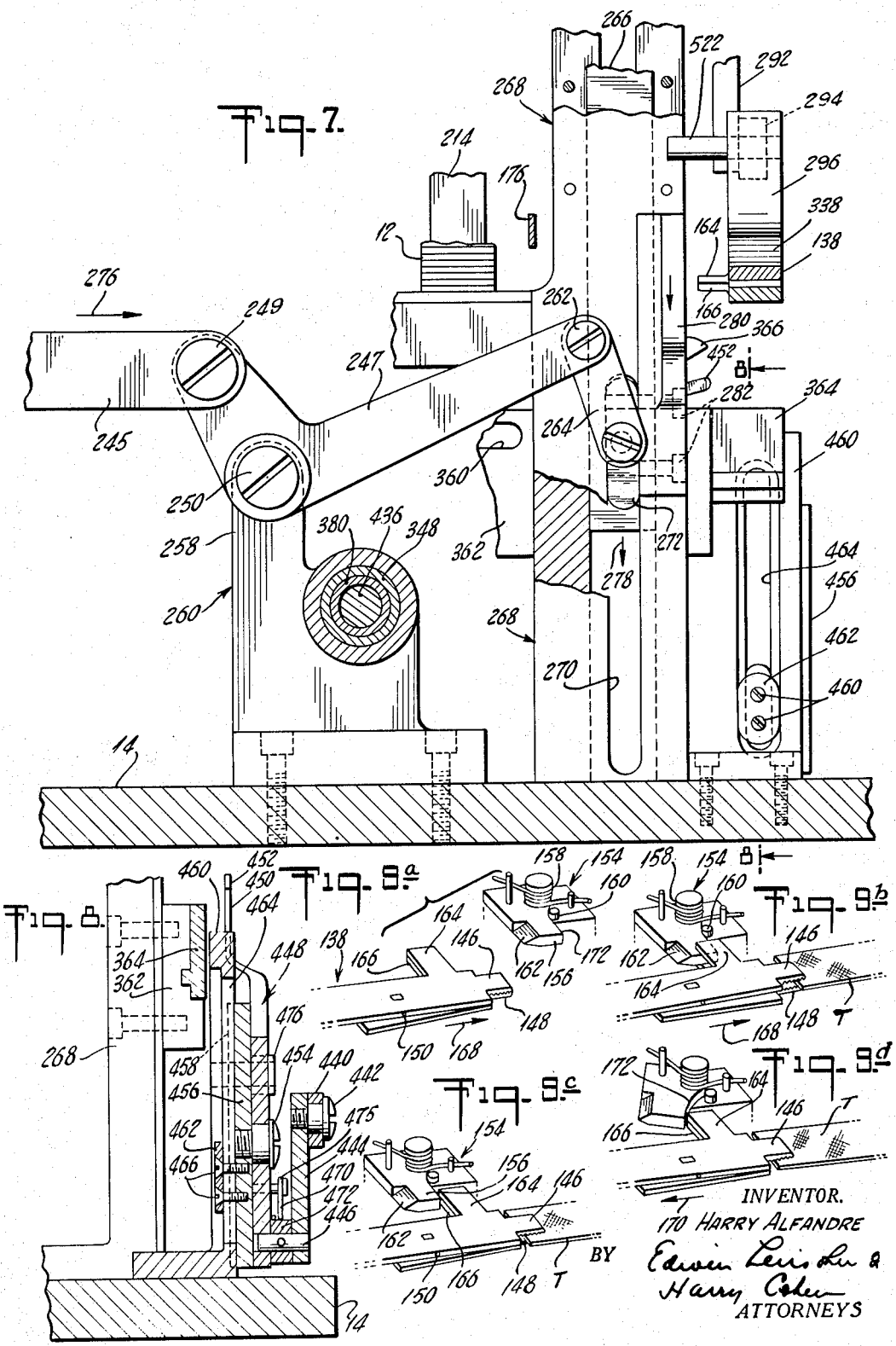

April 17, 1956 H. ALFANDRE 2,742,205
BUCKLE THREADING APPARATUS
Filed Sept. 15, 1951 11 Sheets-Sheet 7
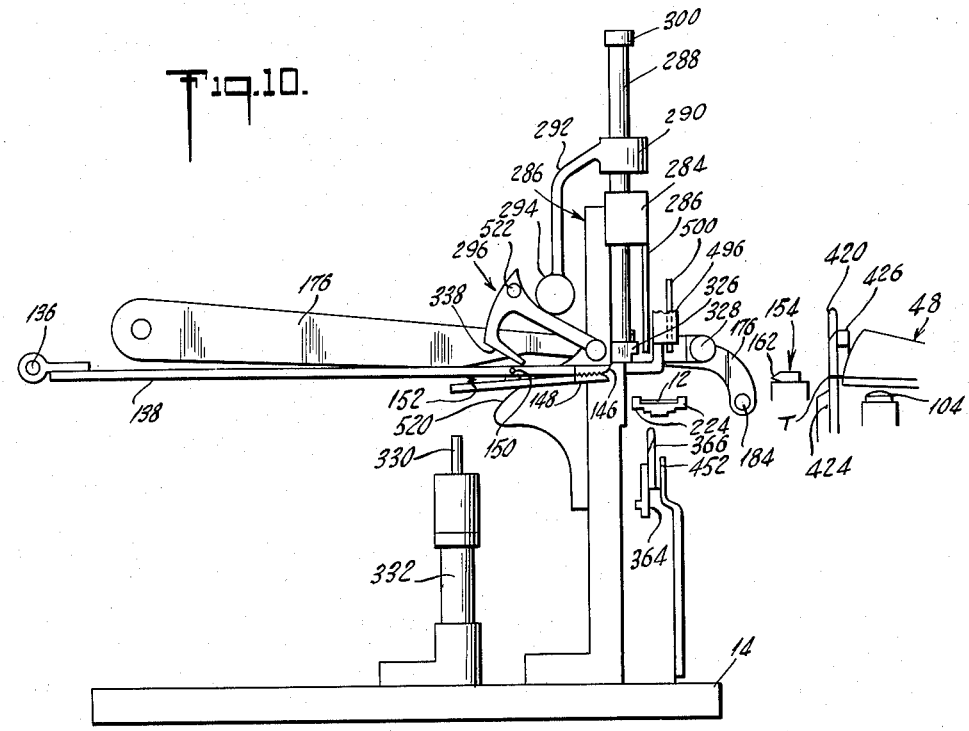
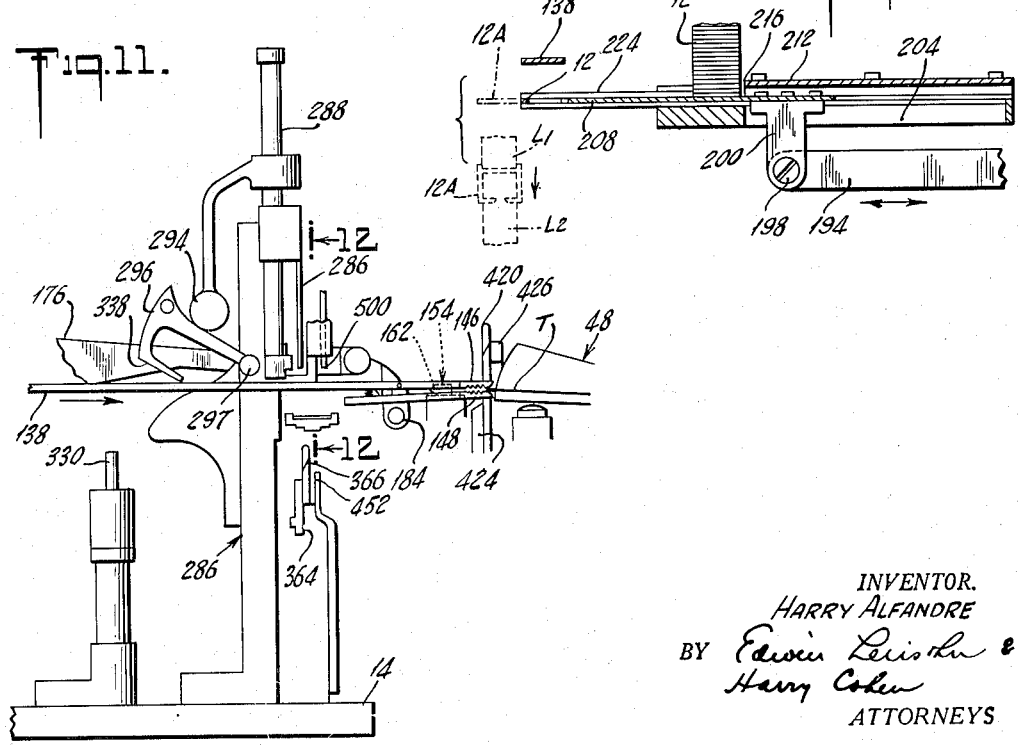
INVENTOR.
HARRY ALFANDRE
BY Edwin Levisohn &
Harry Cohen
ATTORNEYS

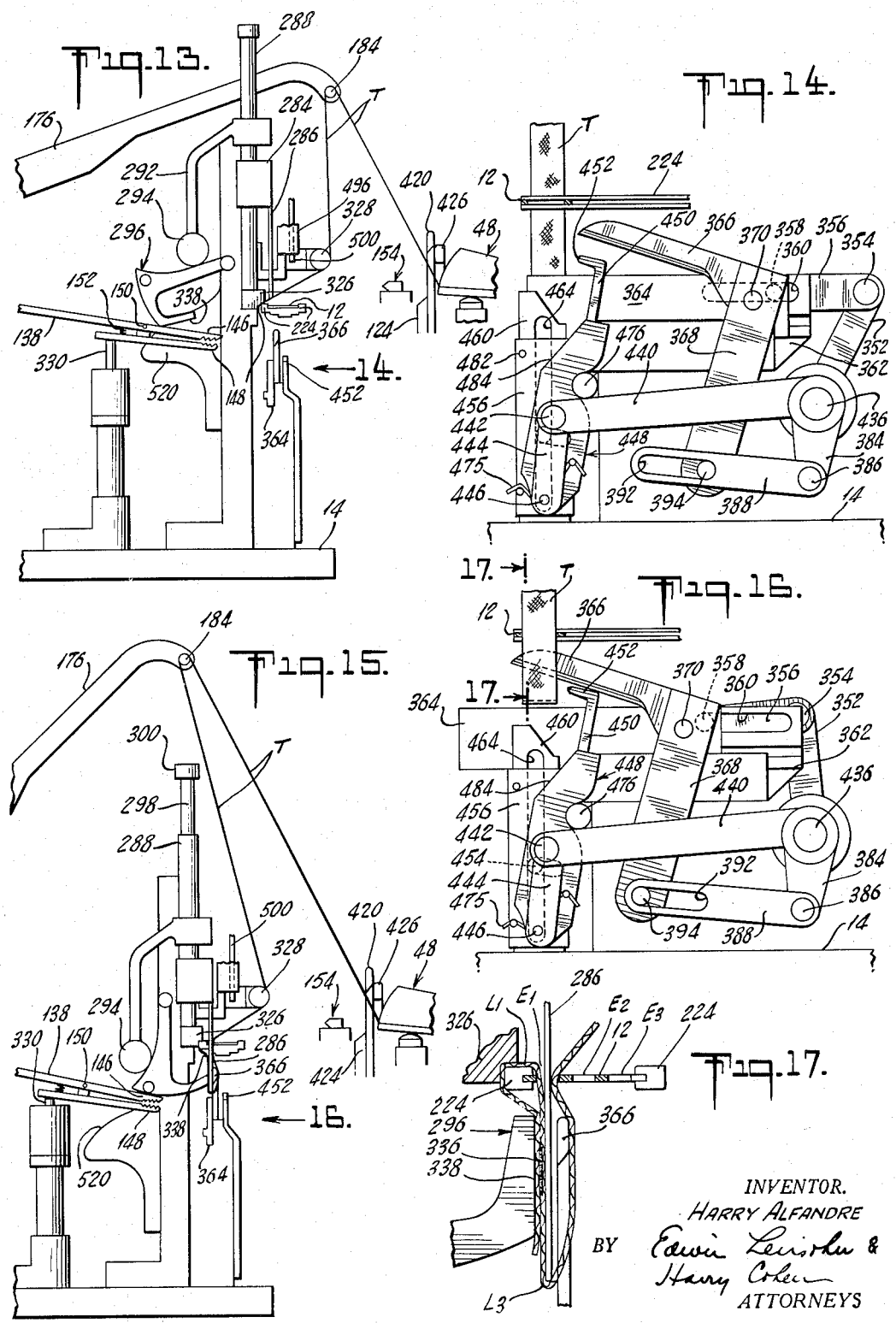

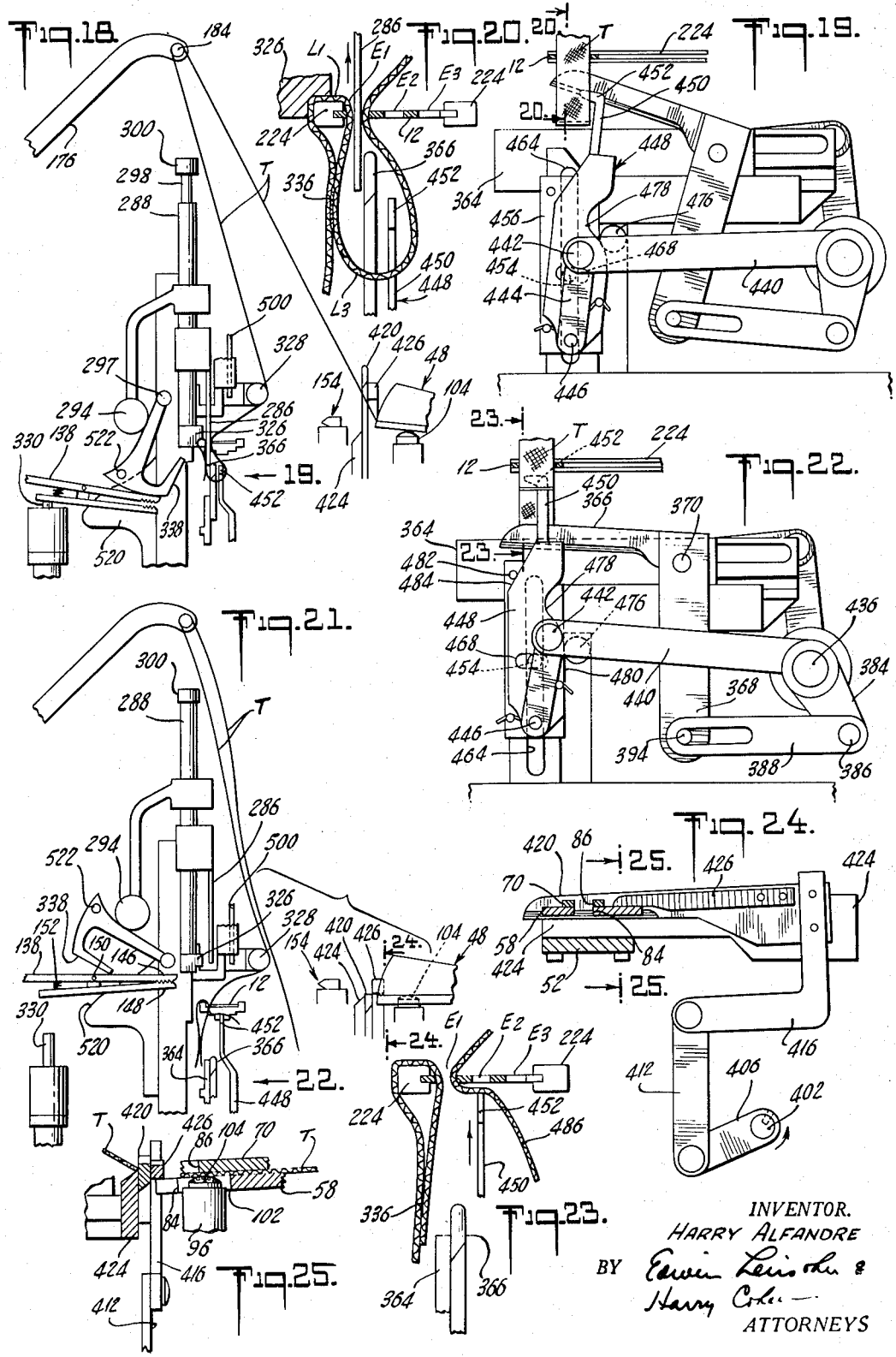

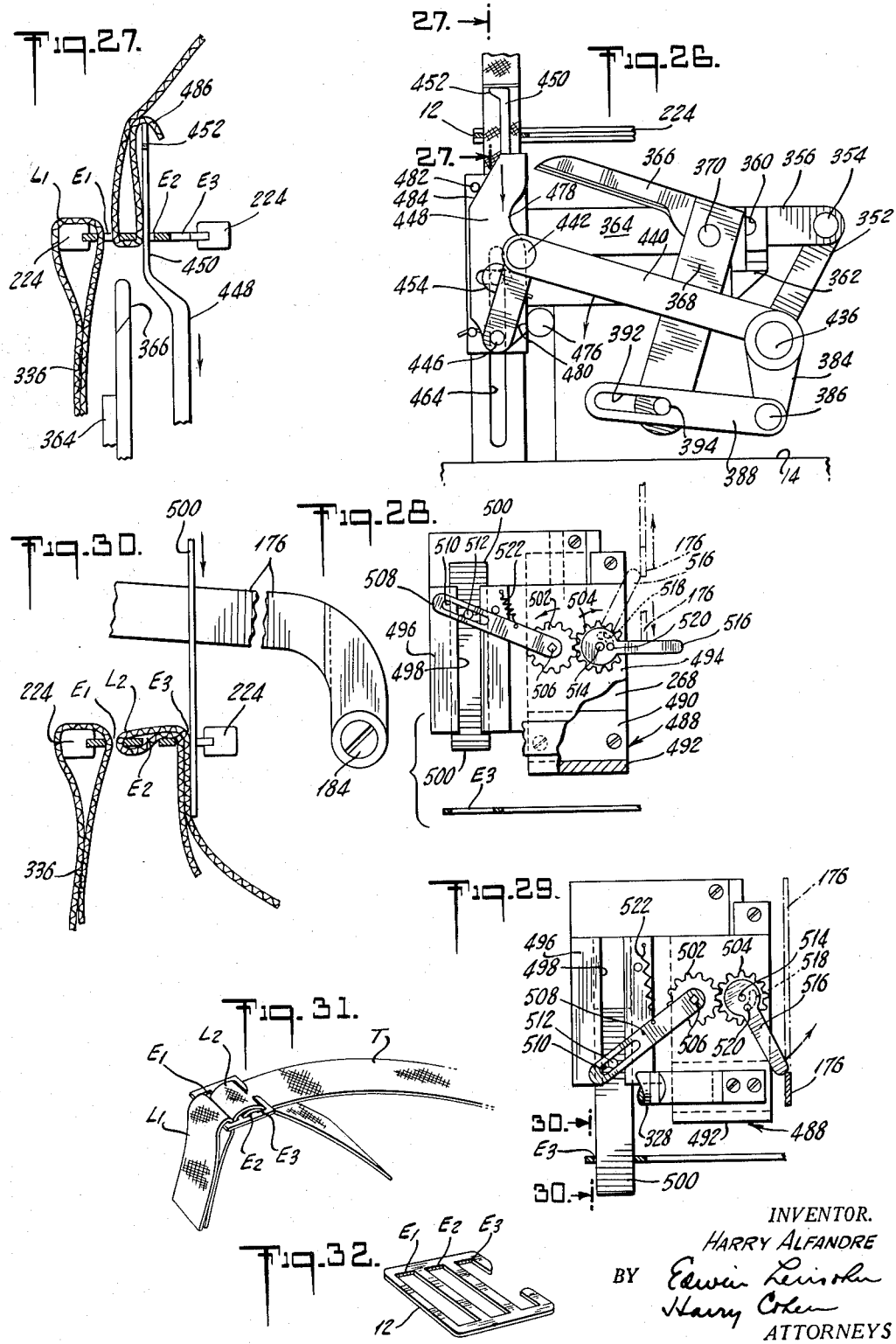

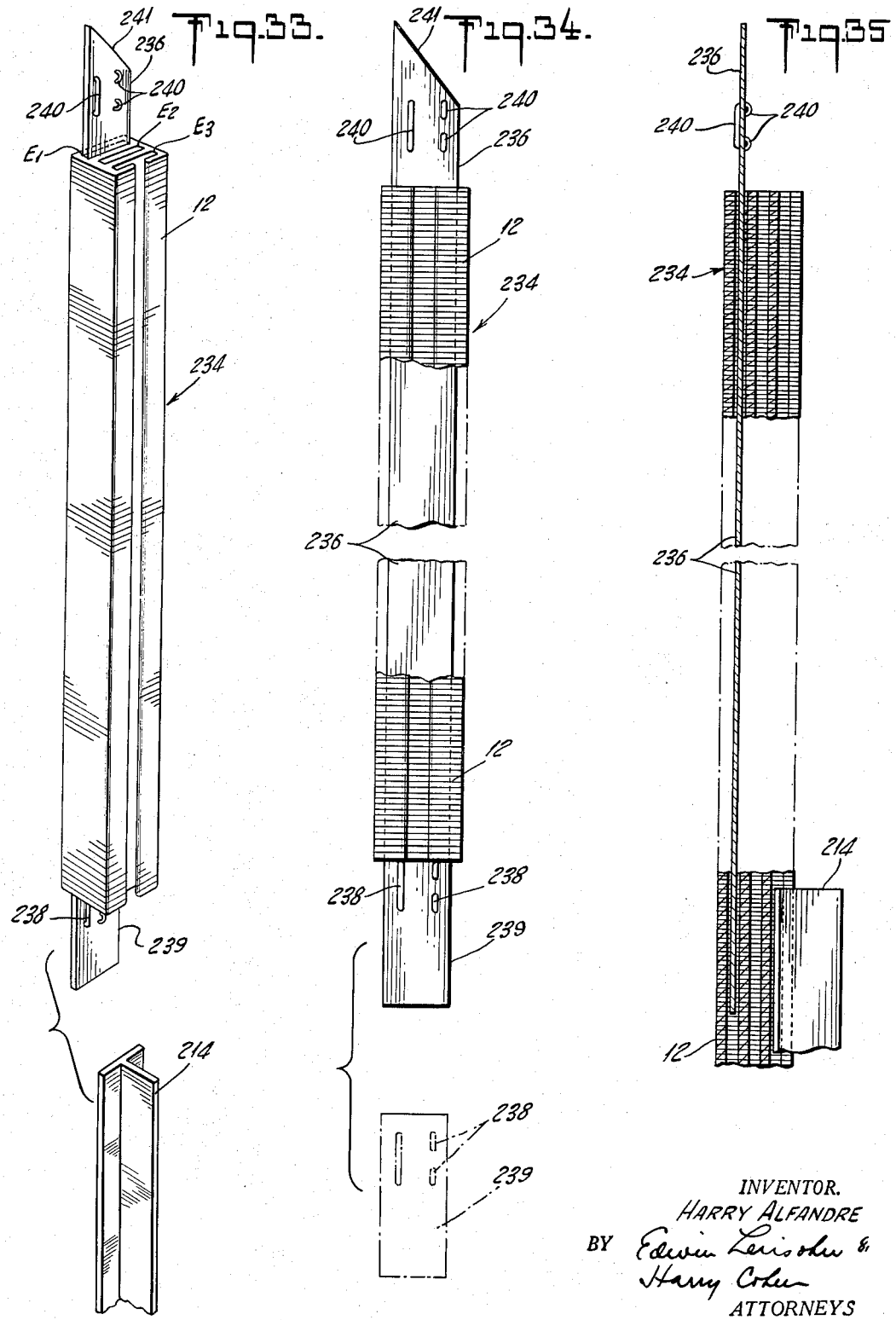

United States Patent Office 2,742,205
Patented Apr. 17, 1956

2,742,205

BUCKLE THREADING APPARATUS

Harry Alfandre, Jamaica, N. Y.

Application September 15, 1951, Serial No. 246,834

38 Claims. (Cl. 223—49)

This invention relates to a device for facilitating the insertion of straps or tapes through the openings in buckles or similar members. Although the device is adapted for other purposes, it is intended primarily for use in the manufacture of adjustable shoulder straps of the type extensively utilized in ladies' undergarments.

In one well known construction of adjustable shoulder or similar straps, two strips of tape are looped separately through openings in a buckle having three eyelets defined by the sides of the buckle and two intermediate bars. One of said strips is passed through one of the eyelets to form a fixed loop and is intended to have both ends thereof secured to the garment. The other of said strips is threaded through the buckle to form an adjustable loop and only one end thereof is intended to be secured to the garment, the other end being free in order to accomplish the adjustment of the strip, and the loop formed thereby, in the buckle. In the case of shoulder straps, the eyelets are relatively small and it is difficult and time-consuming to pass the ends of the tape through the eyelets, especially in the case of the adjustable strip because the latter is usually passed once through two of the eyelets and twice through the third eyelet. Owing to these difficulties the cost of the labor necessary to assemble the tapes with the buckles in forming the adjustable loop has been disproportionately large, and owing to the length of time necessary to assemble the buckles with the tapes, production of the garments in which the adjustable straps are used is frequently delayed. It is therefore an object of the present invention to eliminate these difficulties and delays and to substantially reduce the cost of manufacture of adjustable shoulder straps or similar articles.

With this object in view, I have constructed a device which greatly facilitates the insertion of the tapes through the buckles, thereby considerably reducing the cost of producing adjustable shoulder straps and accelerating the production of the straps and the garments provided therewith. In accordance with the present invention, the buckles are automatically supplied and fed to a buckle holder means in which they are retained during the threading operation, being ejected therefrom as the succeeding buckle arrives in position to be threaded. The provision of an apparatus in which the buckles are automatically supplied, fed to, and ejected from the buckle holder means, constitutes another object of the present invention.

Another object of the invention is to provide an apparatus in which one of the tape strips is looped through one buckle eyelet and the ends thereof secured together to constitute a non-adjustable loop, the other strip being passed once through the same eyelet, once through a second eyelet and twice through a third eyelet, to constitute an adjustable loop, both of said loops being formed entirely by one or more elements of the apparatus.

A further object is to provide means for facilitating the loading of the buckle supply device constituting parts of the automatic buckle feeding means of the present invention.

A yet further object of the invention is generally to improve the art of manufacturing adjustable straps and to provide a highly efficient apparatus for that purpose.

The above and other objects, features and advantages of the present invention will be more fully understood from the following description considered in connection with the accompanying illustrative drawings.

In the drawings:

Fig. 4 is a sectional view, on an enlarged scale, taken on the line 4—4 of Fig. 3, with parts broken away;

Figs. 4A, 4B, 4C and 4D are sectional views taken on the lines 4A—4A, 4B—4B, 4C—4C and 4D—4D, respectively, of Fig. 4;

Fig. 5 is a sectional view, on an enlarged scale, taken on the line 5—5 of Fig. 3;

Fig. 6 is a sectional view, on an enlarged scale, taken on the lines 6—6 of Figs. 3 and 4, with parts broken away;

Fig. 7 is a sectional view, on an enlarged scale, taken on the line 7—7 of Figs. 3 and 6, with parts broken away;

Fig. 8 is a sectional view taken on the lines 8—8 of Figs. 4 and 7;

Figs. 9A, 9B, 9C and 9D are views illustrating the operation of the tape-gripping device of the present apparatus;

Fig. 10 illustrates a portion of the apparatus showing pertinent parts as disposed prior to the beginning of a cycle of operation thereof, said parts being illustrated more or less diagrammatically;

Fig. 11 is a view similar to Fig. 10, illustrating the tape being gripped by the tape-gripping device at the start of a cycle of operation;

Fig. 12 is a sectional view, on an enlarged scale, taken on the line 12—12 of Fig. 11, illustrating the ejectment of a threaded buckle at the end of a cycle of operation;

Fig. 13 is a view similar to Fig. 10, illustrating the withdrawal of a predetermined length of tape from the tape supply;

Fig. 14 is a view, on an enlarged scale, taken in the direction of the arrow 14 in Fig. 13, illustrating the disposition of the parts during the operational step illustrated in Fig. 13;

Fig. 15 is a view similar to Fig. 10, illustrating the first threading operation during which the fixed loop is formed;

Fig. 16 is a view taken in the direction of arrow 16 in Fig. 15, illustrating the disposition of the parts in the step illustrated in Fig. 15;

Fig. 17 is a sectional view, on an enlarged scale, taken on the line 17—17 of Fig. 16;

Fig. 18 is a view similar to Fig. 10, illustrating a step in the formation of the adjustable loop;

Fig. 19 is a view, on an enlarged scale, taken in the direction of the arrow 19 in Fig. 18;

Fig. 20 is a sectional view, on an enlarged scale, taken on the line 20—20 of Fig. 19;

Fig. 21 is a view similar to Fig. 10, and illustrates the next step in the formation of the adjustable loop, and also the application of an adhesive substance to the tape;

Fig. 22 is a view, on an enlarged scale, taken in the direction of the arrow 22 in Fig. 21;

Fig. 23 is a sectional view, on an enlarged scale, taken on the line 23—23 in Fig. 22;

Fig. 24 is a sectional view, on an enlarged scale, taken on the line 24—24 of Fig. 21;

Fig. 25 is a sectional view taken on the line 25—25 of Fig. 24;

Fig. 26 is a view similar to Fig. 22 illustrating the disposition of the parts during the threading of the adjustable loop through the intermediate buckle eyelet;

Fig. 27 is a sectional view, on an enlarged scale, taken on the line 27—27 of Fig. 26;

Figs. 28 and 29 are views illustrating portions of the mechanism during the final threading operation;

Fig. 30 is a sectional view, on an enlarged scale, taken on the line 30—30 of Fig. 29;

Fig. 31 illustrates a completed buckle and strap as delivered by the apparatus of the present invention;

Fig. 32 illustrates a buckle prior to the threading thereof;

Fig. 33 is a perspective view of a buckle holder carrying a plurality of buckles and utilized in accordance with the present invention for facilitating the loading of the buckle supply device, a portion of which is illustrated;

Fig. 34 is a side view of the buckle holder, a severed portion thereof being illustrated in broken line; and Fig. 35 is a vertical sectional view through the buckle holder of Fig. 33, illustrating the manner of loading the buckle feeding means of the present apparatus.

Briefly described, the strap and buckle assembling apparatus 10 of the present invention is provided with a stack or supply of buckles 12, preferably of the type illustrated in Fig. 32. As there shown, there is defined in the buckle the eyelets E1, E2 and E3, the latter having an open side. The leading end of a flexible tape or strap T (Fig. 6), preferably formed of a suitable fabric, is initially inserted into the apparatus 10, and during the course of the operation of said apparatus, a predetermined length of said tape is withdrawn from a supply thereof. Said tape is first threaded through eyelet E1, and the portion so threaded is severed from the balance thereof to form a fixed loop L1 (Fig. 31) the ends of which are suitably secured together for ready attachment to a lady's undergarment, or the like. The subject apparatus also forms an adjustable loop L2 which passes once through said eyelet E1, once through the intermediate eyelet E2 and twice through the eyelet E3, the ends of said latter loop being free of mutual securement so that one of said ends may be secured to the garment, the other end being free to permit the adjustment of the loop L2 and the strap length, as is well known to those skilled in the art.

Figure 1:
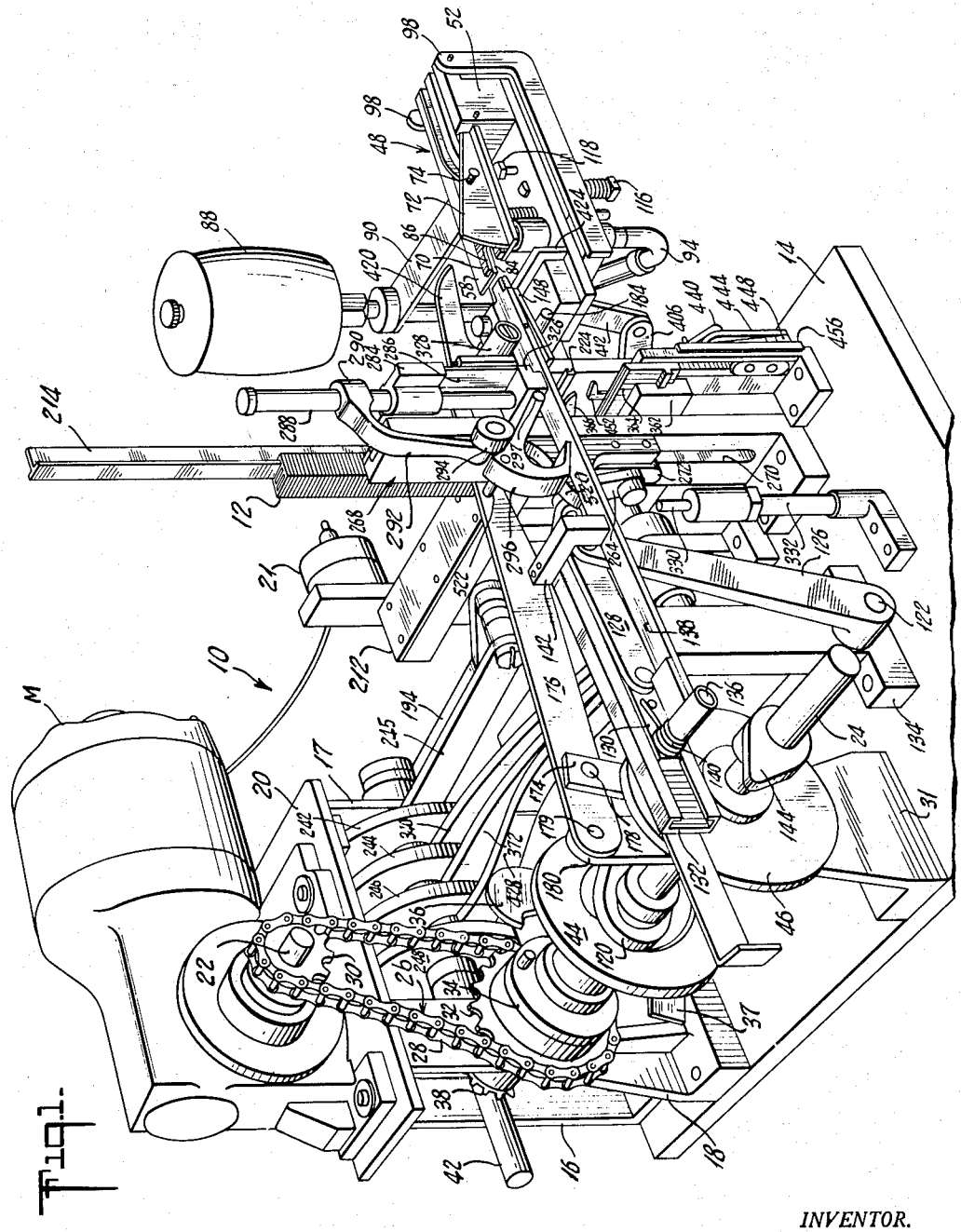
Fig. 1 is a perspective view of an apparatus pursuant to the present invention.
Figure 2:
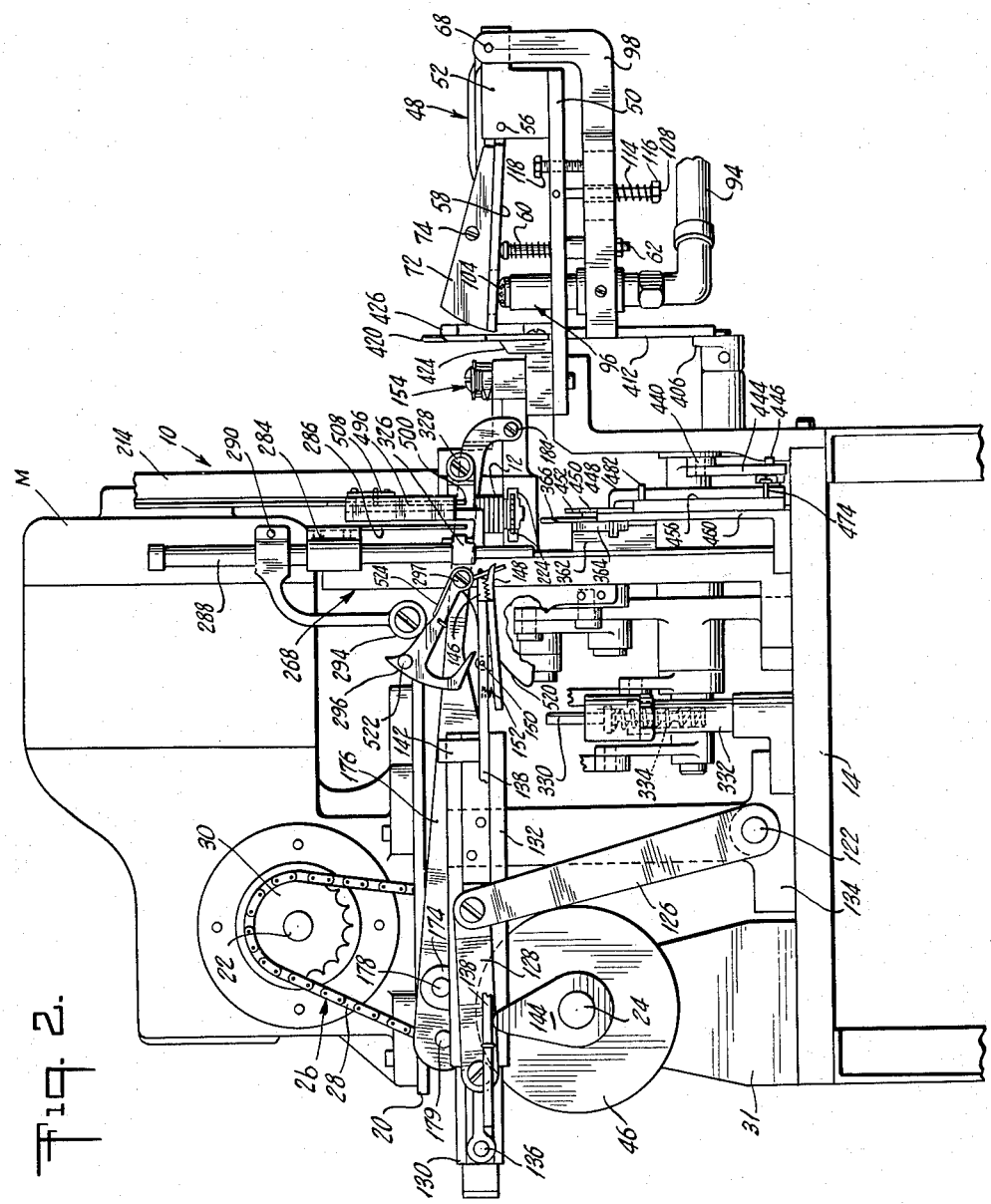
Fig. 2 is an end view of the apparatus, the adhesive-supply container thereof being omitted and parts being broken away for purposes of illustration.
Figure 3:
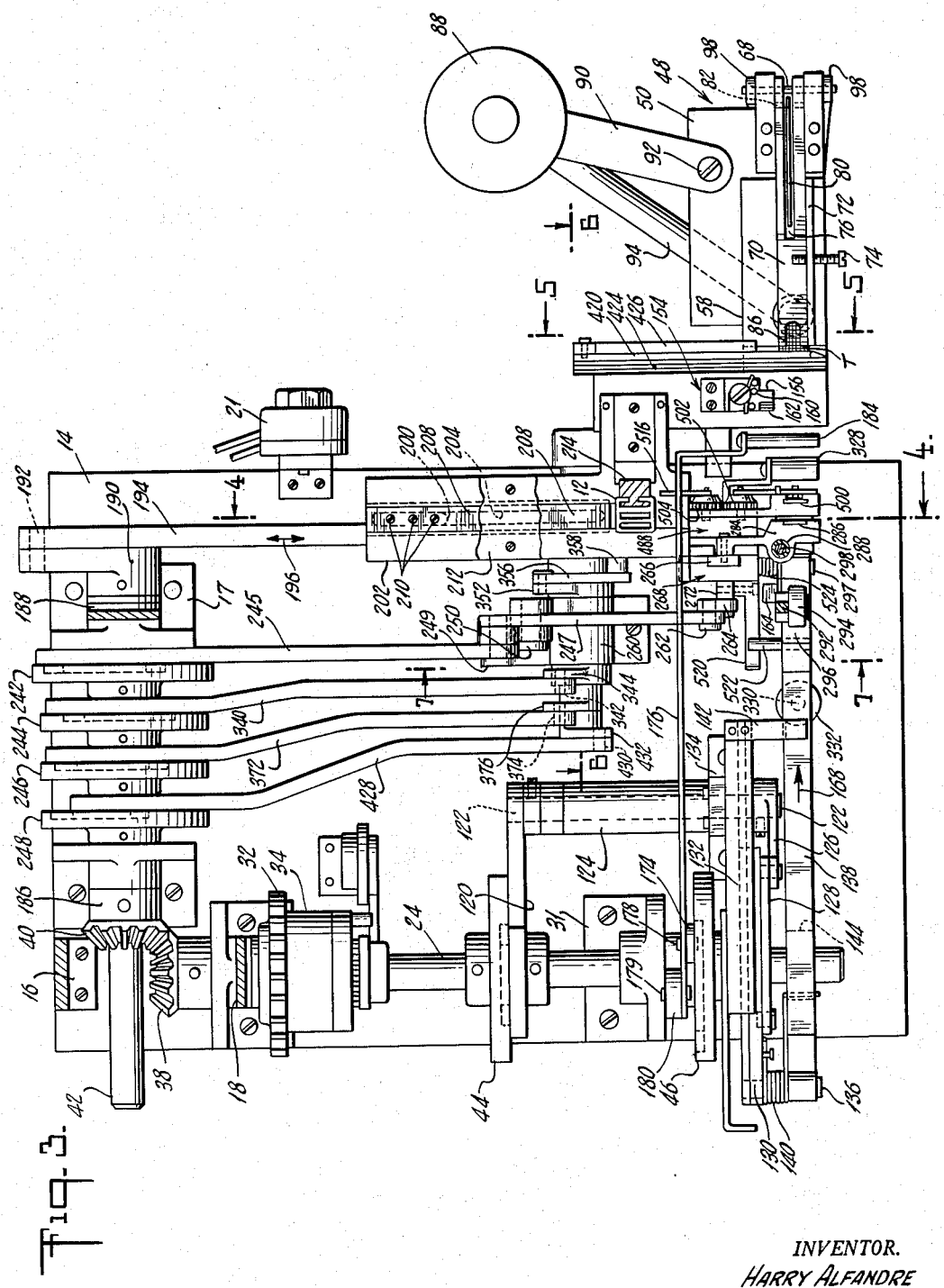
Fig. 3 is a top plan view of the apparatus with parts broken away.

Referring now to Figs. 1, 2 and 3 of the drawings in detail, the apparatus 10 is provided with a frame which includes the base plate 14 for mounting the apparatus on a suitable worktable or support. Frame members 16, 17 and 18 upstanding from the base plate 14 carry a support plate 20 which mounts a suitable electric motor M, the switch therefor being indicated at 21. The shaft 22 of the motor operates the main-drive shaft 24 of the apparatus through the chain drive 26 constituted by the sprocket chain 28 and the companion chain gears 30 and 32. As here shown, the shaft 24 is journalled in said member 18 and in a frame member 31, and is provided with a standard single revolution clutch 34, the stop for which is indicated at 36, the release for said stop being indicated at 37. Shaft 24 is also provided with a bevel gear 38 which meshes with a bevel gear 40 keyed to the auxiliary-drive shaft 42 for driving the latter.

The shaft 24 carries the cam 44 which controls the operation of the parts of the apparatus concerned with the gripping of the free end of the tape T to position the latter at a threading station for the threading operations, and is also provided with the cam 46 which controls the operation of the parts concerned with withdrawing a predetermined length of said tape from the supply thereof. The tape is introduced into the apparatus through the tape-receiving and dispensing device thereof, generally indicated by the reference numeral 48 (Figs. 1, 2, 3 and 6). Said device includes a plate 50 which is secured to the framework of the apparatus, as indicated at 51. At its free end thereof, plate 50 carries a block 52 which is secured thereto as by the screw 54. Said block is provided with a pivot 56 for the pivotally mounted plate 58. The plate 58 is normally biased by the spring 60 in a direction away from the stationary plate 50. As here shown, the plate 58 is provided with a bolt 62 which mounts the spring 60, said bolt being in sliding engagement in a cup 64 secured in the plate 50, the spring 60 being disposed between the plate 58 and the cup 64. The block 52 is provided with lateral extensions 66 which mount a pivot pin 68. A plate 70, which cooperates with the plate 58, is pivotally mounted on the pivot pin 68, it being understood that the plate 70 is normally retained in face-to-face disposition with the plate 58 by gravity. The plate 58 is provided with an upstanding portion 72, having a detent member or bolt 74 threaded therein and overlying the plate 70, as clearly illustrated in Fig. 3, to limit the upward movement of plate 70 upon withdrawal of the tape as hereinafter described in detail. Said plate 70 is also slotted as at 76 to provide for the entrance of the free end of a friction blade 80 which is pivotally mounted on the pivot pin 82. From the foregoing, it will be understood that the free end of the tape T is initially inserted between the cooperating plates 58 and 70, the blade 80 providing a friction hold for the tape. It will be noted that the free ends of the companion plates 58 and 70, are notched as indicated at 84 and 86, respectively, and the free end of the tape, when originally inserted into the device, extends slightly beyond said notches.

In order to provide for the gravity feed of a suitable adhesive or securing agent for securing the ends of the fixed loop L1, as hereinafter explained, there is provided, as here shown, an adhesive or glue-supply container 88 which is carried by an arm 90 secured to the plate 50 as at 92. A supply-tube 94 connects the outlet of said container with an adhesive dispenser device 96 secured to the free ends of the yokes 98—98. Said yokes are pivotally mounted on the aforesaid pivot 68. The dispenser 96 extends through an aperture 100 provided in the fixed plate 50 and is in registry with an aperture 102 provided in the pivotally mounted plate 58. It will be noted that the tape T passes over said aperture 102 and that the companion plate 70 provides a backing for said tape at said aperture. The dispenser 96 is provided with a perforated dispenser head 104 which is slidably mounted therein and which is normally biased to the position thereof illustrated in Fig. 6 by the spring 106. The stationary plate 50 is provided with a depending bolt 108 which extends through an aperture 110 provided in a cross-block 112 which is carried between said yokes 98. Said bolt is provided with a spring 114 which is mounted thereon between said cross-block and a nut 116 whereby to bias the dispenser 96 into position in the aperture 100. An adjustable stop 118 provided in the plate 50 adjusts the position of the dispenser head 96 in the aperture 100. From the foregoing, it will be understood that when the companion plates 58 and 70 are pivoted, as hereinafter described, toward the stationary plate 50, the portion of the tape overlying the aperture 102 will be urged against the dispenser head 104 for the application of adhesive thereto.

As previously indicated, the aforementioned cam 44 controls the operation of the mechanism for withdrawing the tape from the device 48 and for depositing the tape at the threading station. Said cam is an inside cam and is provided with a cam follower 120 which is reciprocated thereby for rocking shaft 122 carried by the free end of said follower, said shaft extending through a spacer sleeve 124 for engagement in a crank 126. The crank 126 is pivoted to one end of a link 128, the other end of which is secured to a slide 130 which is mounted for reciprocation in the stationary channel member 132 carried by the stud 134 which is mounted on the base plate 14. It will be noted that the aforementioned shaft 122 is journalled in said stud. The slide 130 is provided with a laterally extending pin or pivot 136 which pivotally mounts the tape gripper means 138. From the foregoing it will be understood that as the follower 120 rides in the cam 44, the shaft 122 is periodically rotated or rocked in opposite directions to rock the crank 126 back and forth for reciprocating the link 128 and the slide 130 whereby the tape gripper 138 is similarly reciprocated and pivotally movable about the pin 136. In this connection, it will be noted that a spring 140 disposed about the pin 136 tends to bias the tape gripper 138 in an upward direction to engage a detent 142 carried by the channel 132. A pear shaped cam 144 is carried by the previously mentioned shaft 24 and periodically engages the tape gripper 138 to kick the latter in an upward direction, as illustrated in Fig. 2.

At the free end thereof, the tape gripper 138 is provided with an upper gripper jaw 146 (Figs. 9A–9D) and with a cooperating lower gripper jaw 148, the latter being pivotally mounted on the former as at 150 (Fig. 2), and said jaw members being biased into engagement by the spring 152.

In order to provide for the opening and closing of said jaws so as to engage the free end of the tape T, provision is made for jaw opening means 154 mounted on the framework of the apparatus adjacent the tape receiving device 48, as illustrated in Fig. 6. Said opening means is provided with the pivotally mounted jaw spreader 156 which is normally biased by the spring 158 to the position thereof illustrated in Fig. 9A, a detent 160 serving to retain the jaw opener in said position. It will be noted that the jaw opener is provided with a tapered or cam portion 162 which is adapted to cooperate with the lateral extensions 164 and 166 carried by the previously mentioned jaw members 146 and 148, respectively. Referring now to Fig. 9B, it will be noted that as the tape gripper 138 moves in the direction of the arrow 168 in response to the operation of the cam follower 120, as previously described, the extensions 164 and 166 will engage the tapered portion 162 of the jaw opener, said tapered portion being disposed in the path of movement of said lateral extensions. As said extensions pass over said tapered portion, the lower jaw member will pivot away from the upper jaw member, against the bias of the spring 152 so that said jaws will be spread apart to receive therebetween the free end of the tape which extends outwardly of the previously mentioned cooperating plates 58 and 70 which are notched at 84 and 86 to facilitate the entry of said jaw members. As the jaw members pass over and disengage the jaw opener 156, as illustrated in Fig. 9C, it will be apparent that said jaw members will close upon the tape T as illustrated in said figure, which also illustrates the maximum outward movement of the jaw gripper 138. Said gripper will now, in accordance with the movement of the follower 120 in response to the cam 144, reverse its direction and move in the direction of the arrow 170 in Fig. 9D to withdraw the tape from the tape device 48 and from the tape supply. Upon said return movement, the jaw extensions 164 and 166 will strike the untapered edge 172 of the jaw opener 156, as illustrated in Fig. 9D, whereby the latter will now pivot in the opposite direction against the bias of spring 158 until said extensions clear said jaw opener at which time the spring will be effective to return said jaw opener to the position illustrated thereof in Fig. 9A.

As the tape is being withdrawn from the device 48, a predetermined length thereof is simultaneously measured with the withdrawal thereof. This is accomplished by the action of the previously mentioned cam 46 carried by the shaft 24. More specifically, it will be noted, as illustrated in Fig. 3, that said cam is also of the internal type and is provided with a cam follower 174 which is pivotally secured to an arm 176 as at 178 in Figs. 1 and 2. Adjacent its securement to the follower 174, said arm is pivotally mounted on a pivot pin 179 carried in a pivot bracket 180 extending from the bearing bracket or frame member 31 in which the shaft 24 is journalled. Therefore, it will be apparent that the arm 176 will pivot about the pin 179 in response to the movement of the follower 174. In this connection, it will be understood that the cam 46 is provided with a predetermined dwell to keep the arm 176 in a raised position, as required, and as hereinafter described in detail. At its free end, the arm 176 is provided with a roller 184 which is disposed below the path of movement of the gripper 138 when the latter is withdrawing the tape from the device 148 so that when the arm 176 begins to move upwardly, the tape that has been withdrawn will be engaged by said roller and a predetermined length thereof, as determined by the extent of movement of the arm 176, will be withdrawn from the tape supply. The upward withdrawal of the tape causes the plate 70 to pivot upwardly until it strikes the previously mentioned detent 74.

The previously mentioned shaft 42 is journalled for rotation in a bearing member 186 carried by the base plate 14 and in a bearing portion 188 of the frame member 17. Adjacent said bearing 188, the shaft is provided with a crank 190 which is pivotally connected, as at 192, to a crank arm 194 (Fig. 3) for reciprocating the latter in the directions of the arrowheads 196. Referring now to Fig. 4, it will be noted that the crank arm 194 is connected, as at 198, to a carriage 200 which is mounted for reciprocation in a slideway 202 provided with a longitudinally extending slot 204 (Fig. 6) through which said carriage extends. The slideway is grooved as at 206 for slidably receiving a buckle positioner or ejector blade 208 secured to the carriage 200 as at 210. The slideway is provided with a cover 212 having depending portions 214 (Fig. 6) which extend into the upper end of the slot 204 for slidably engaging the ejector blade 208 to prevent the buckling of the latter.

The buckles 12 are threaded through their open-ended eyelets E3 on a buckle-supply device constituted by the vertically extending T-bar 214 (Fig. 1) which is mounted so as to position the stack of buckles adjacent the end 216 of the cover 212. Referring now to Figs. 4C and 4D, it will be noted that the portions 220 of the slideway, which overlies the buckle groove 206 underneath the cover 212, are cut away from the slideway, outwardly of the end 216 of said cover, as at 218 in Fig. 4C to permit the buckles to drop directly onto the shoulders 222 of said groove 206, which shoulders are obstructed by said overlying portions 220 underneath the cover 212. Therefore, it will be readily apparent that, at the cut-away portions 218, the buckles 12 are free to drop directly into the slideway 202 and be supported on the shoulders 222 thereof. A pair of spaced grooved buckle holding members 224—224 (Fig. 4B) are inserted into the slideway 202 to receive the buckles from the slideway. More specifically, it will be noted that at the outer end 226 thereof, as illustrated in Fig. 4A, the slideway is again provided with the overlying portions 220, the groove 206 however now being enlarged, as at 206A, to accommodate the holders 224. It will be understood that the grooved portions 225 of the members 224 are in registry with the sides of the groove 206 in the portion of the slideway underneath the cover 212 to form a continuous buckle groove therewith. From the foregoing it will be apparent that the slideway is provided with an opening in the upper surface thereof adjacent the end 216 of the cover, which opening is defined by the cut-away portions 218 thereof (Fig. 4C) and is of sufficient size to permit the lowermost buckle to fall into the slideway. Thereafter, as the crank arm 194 is moved in the direction of arrow 230 in Fig. 4, to move the ejector blade 208 in the direction of arrow 232, it will be apparent that the lowermost buckle will be projected in the same direction from the stack thereof and be carried into the spaced buckle holders 224. Fig. 12 illustrates the forwardmost position of the ejector blade 208. A buckle in position at the threading station in the buckle holders 224, as at 12A in Fig. 4, will be ejected from said buckle holders in the manner indicated in broken line in Fig. 12, upon the arrival of the following buckle. It will be understood that the ejected buckle has already been provided with the fixed loop L1 and with the adjustable loop L2. Therefore, it will be noted that the ejector blade moves the lowermost buckle from the stack thereof to the position to be threaded and simultaneously ejects a threaded buckle. Upon the return of the ejector blade to the position thereof illustrated in Fig. 4, the buckle which is in the lowermost position in the buckle stack will fall into position immediately before the ejector blade for the following cycle of operation.

In order to expeditiously thread the buckles onto the T-bar 214, the buckles are provided on a stacking and transferring device, designated generally by the reference numeral 234 (Fig. 33). Said device comprises a strip 236 of any suitable material, such as steel, wood, cardboard, fiber board, etc., although fiber board is preferred. One end of said strip is first provided with suitable buckle retaining means which penetrate the strip and extend from the face thereof, such as wire-staples 238, to prevent the buckles from moving off that end of the strip. The other end of the strip is tapered as at 241 to facilitate the insertion of said end of the strip preferably into the buckle eyelets E1. After a desired number of buckles are stacked on the strip, the strip is again stapled, as at 240, at said tapered end whereby it will be apparent that the buckles are now retained on the strip by the staples at both ends thereof. In order to thread the buckles onto the T-bar 214, the strip is held above the T-bar, with the tapered end uppermost, and a few of the buckles are threaded onto T-bar 214, more specifically, the open ended eyelets E3 being so threaded on the T-bar in the manner illustrated in Fig. 35. Thereafter, the lower end portion 239 of the strip is severed therefrom immediately above the staples 238, as illustrated in broken line in Fig. 34, so that the entire stack of buckles slips off the strip and threads onto the T-bar 214, Fig. 35 illustrating the buckles moving off the strip 236 onto the T-bar.

The shaft 42 is provided with the internal cams 242, 244, 246 and 248 (Fig. 3). Cam 242 controls the operation of the parts which thread the tape into the eyelet E1 to form the fixed loop L1. The cam 242 is provided with a follower 245 which reciprocates in response to the rotation of the cam 242. Said follower is connected to one end of the bell crank lever 247 (Fig. 7) at 249, said lever being pivotally mounted, as at 250, on an extension 258 of a shaft bearing member 260 which is mounted on the base plate 14. At its other end, the bell crank lever 247 is connected, as at 262, to a link 264 for the vertical reciprocation of a slide 266. More specifically, a vertically disposed slideway 268 is mounted on the base plate 14, said slideway being provided at one side thereof with the longitudinal slot 270. Referring now to Fig. 6, it will be noted that the slide 266 is provided with a lateral extension 272 which projects through the slot, the link 264 being pivoted thereto as at 274. Therefore, it will be apparent that as the follower 245 moves in the direction of the arrow 276 in Fig. 7, the bell crank lever 247 will pivot in a direction to carry the slide 266 in the direction of the arrow 278, Fig. 7 illustrating the slide in the uppermost position thereof. A cam member 280, the function of which will presently appear, is secured to the extension 272 as by the screws 282. At the upper end thereof, the slide 266 is provided with a bracket 284 which mounts, as at 285, a depending threader member or plate 286 for forming the fixed loop L1. Referring now to Fig. 4 in detail, it will be noted that the bracket 284 carries a sleeve 288 which is mounted for vertical reciprocation by the slide 266, said sleeve rigidly mounting, as at 290, a downwardly extending member 292 provided on the free end thereof with a roller 294 (Fig. 1). Said roller engages a depresser member 296 which is pivotally mounted, as at 297, on the slideway 268. A shaft 298 (Fig. 4) is mounted within the sleeve 288, one end of the shaft being secured by a pin 301 in a cap 300 above the top of the sleeve. A compression spring 320 is disposed in the sleeve 288, being mounted on the shaft 298 between a shoulder 322 thereon and the upper end 324 of the sleeve. At its lower end, the shaft is provided with a tape holding member or shoe 326. A stationary roller 328 (Fig. 1) is also provided on the slideway 268.

Fig. 11 illustrates the tape gripper 138 which has moved from the position thereof illustrated in Fig. 10 to grasp a glued tape end between the tape gripper jaws 146 and 148, as previously described, with reference to Fig. 9C. Upon return movement of the tape gripper 138 to its original position, the sleeve 288 begins to descend, as illustrated in Fig. 13. Due to said downward movement of the sleeve, the roller 294 carried by the member 292 causes the depresser 296 to pivot downwardly to engage the tape gripper 138, causing the latter to pivot downwardly about the pin 136 against the bias of the spring 140. The lower jaw member 148, at the end opposite the tape gripping end thereof, engages a stop 330 (Fig. 2) carried by a standard 332 mounted on the base plate 14, said stop being biased in the direction outwardly of said standard by the spring 334. Continued downward movement of the depresser 296 causes the lower jaw member, at its tape gripping end, to pivot away from the upper jaw member about the pivot 150 and against the bias of the spring 152, causing the tape gripper 138 to release the tape, the depresser 296 continuing to rotate to the position thereof illustrated in Fig. 15 due to continued downward movement of the sleeve, the withdrawal of the stop 330 within the standard 332 permitting said continued movement of the depresser 296. Said downward movement of the sleeve 288 results in the downward movement of the shaft 298 until the shoe 326 carried thereby wedges the released end of the tape against the buckle holder 224. However, it will be understood that the sleeve continues to move downward, after the shaft has stopped moving, to complete the pivotal movement of the depresser member 296, the spring 320 compressing as a result of said continued downward movement of the sleeve, said spring being effective to return the sleeve and the parts carried thereby to the original positions thereof during the course of the cycle of operation. After the tape has been released by the gripper 138 and wedged by the shoe 326, the previously mentioned arm 176 begins to pivot upwardly, and the roller 184 thereof, which had originally been disposed below the path of movement of the tape gripper 138, as illustrated in Figs. 10 and 11, now begins to move upwards to withdraw a predetermined length of tape from the tape supply, the tape being tensioned by the stationary roller 328 during said upward movement thereof. Simultaneously with the downward movement of the sleeve 288, the threader member 286 is carried downwardly to thread a portion of the tape through the eyelet E1, as illustrated in Fig. 17, to form the fixed loop L1. As previously indicated, the end of the tape which is withdrawn from the tape inserting device 48, has already been supplied with a dab of adhesive at the under-surface thereof, as illustrated at 336 in Fig. 17. The adhesive or glue being applied to the free end of the tape, which has been now released by the gripper jaws, as illustrated in Fig. 13, continued pivotal movement of the depresser 296, causes a flat surface portion 338 of the depresser to engage the free end of said tape, opposite the surface provided with the adhesive, to press the free end of the glued tape against a threaded portion thereof, as in Fig. 17, so that the glue secured to the under-surface of said free end secures said portions of the tape together, the threader member 286 serving as a backing for the pressure applied to the tape portions by the member 296.

Having formed the fixed loop L1 as in Fig. 17, the latter is now in condition to be severed from the balance of the tape to constitute the fixed strap. This operation is performed under the control of the previously mentioned cams 244 and 246 on the shaft 42. Cam 244 is of the internal type and causes the reciprocal movement of its cam follower 340 which is pivotally connected, as at 342 (Fig. 6), to a crank 344. Crank 344 is keyed, as at 346, to a sleeve 348, said sleeve being keyed, as at 350, to a crank 352. Crank 352 is pivotally connected as at 354 (Fig. 4) to a link 356 which is provided at its other end with a pin 358 which passes through a slot 360 in slideway 362 to interconnect said link and a shear blade 364 mounted for horizontal reciprocation in said slideway. A shear 366, carried at one end of an arm 368, is pivotally connected to the shear blade 364, as at 370. From the foregoing, it will be apparent that rotation of the cam 244, which provides the reciprocation of the follower 340, results in the horizontal reciprocation of both the shear blade 364 and its companion pivoted shear 366. Referring now to Figs. 14 and 16, it will be noted that said operation of the cam 244 results in the movement of the shear blade 364 in a direction to position the shear 366 within a loop L3 (Fig. 17) formed in the withdrawn tape by the previously mentioned threader member 286.

The shear 366 must now pivot downwardly from the position thereof illustrated in Fig. 16 to the position thereof illustrated in Fig. 22, in order to accomplish the severing of the loop L3 in order to detach the fixed loop L1 from the tape. This is accomplished through the operation of the internal cam 246. Said cam provides for the reciprocation of its follower 372 which is pivotally connected as at 374 (Fig. 6) to a crank 376 which is keyed, as at 378, to the sleeve 380 which is disposed within the previously mentioned sleeve 348 and is keyed, as at 382, to a crank 384. Crank 384 carries a pin member 386 on which are mounted the links 388 and 390 separated by a spacer 392. Referring now to Fig. 4, it will be noted that the link 388 is provided at the free end thereof with the slot 392 in which there rides the pin 394 carried by the previously mentioned arm 368 of the shear 366, said arm and shear being pivotally mounted on the shear blade 364 at 370, as previously indicated. Referring now to Figs. 14 and 16, it will be noted that due to the lost motion connection constituted by the pin 394 and the slot 392 of the link 388, the forward movement of the shear blade 364, which results in the positioning of the shear 366 in the loop L3, will prevent the pivotal movement of the shear 366 until the pin 394 has traveled the entire distance of the slot 392. At this point, the link 388 is retracted from the position illustrated thereof in Fig. 16, to the position illustrated in Fig. 22 to cause the downward pivoting of the shear 366 to sever the tape at the loop L3.

Simultaneously with the cutting of the loop L3, the tape is also severed at the previously mentioned device 48 at which the tape is introduced into the apparatus. This is also accomplished through the operation of the previously mentioned cam 246 and cam follower 372 acting through the link 390. Said link is provided at its outer end with the pin member or pivot 396 which connects the link to a crank 398 (Fig. 6), a spacer 400 separating the link and the crank. The crank is keyed to a shaft 402 which is journalled in a bearing 404. A crank 406 keyed to the shaft 402, as at 408, is pivotally connected as at 410 to link 412.

Referring now to Fig. 5, it will be noted that the link 412 is pivotally connected, as at 414, to a bell crank lever 416 which is secured, as at 418, to a shear 420. Shear 420 is pivotally mounted, as at 422 to a companion stationary shear blade 424. A finger 426 is rigidly secured to the shear 420 as at 428. As illustrated in Fig. 1, the stationary shear blade 424 is disposed below and transversely of the path of movement of the tape from the device 48 on the apparatus. As the shear 420 pivots downwardly to the stationary shear blade 424 to cut the tape, as illustrated in Fig. 25, the finger 426, carried thereby simultaneously engages the free end of the previously mentioned pivotally mounted plate 58 to pivot the latter downwardly from the position illustrated thereof in Fig. 6. As previously indicated, said plate being provided with the opening 102 in registry with the adhesive dispenser 96, carries the tape portion overlying said opening onto the dispenser head 104 to apply a dab of adhesive or glue thereto, the companion plate 86 serving as a backing for the tape while the adhesive is being applied thereto. From the foregoing, it will be apparent that the tape is cut simultaneously through the loop L3 by the shear 366 and at the device 48 by the shear 420 to form two straps, the adhesive being applied at the same time to the forward end of the tape remaining in said device.

The fixed loop L1 having been threaded through the eyelet E1 and the sealed ends thereof having been severed from the balance of the tape, the next operation to be performed is the threading of the intermediate eyelet E2. This is accomplished by the operation of parts controlled by the cam 248. The cam 248 is provided with a cam follower 428 which is pivotally connected as at 430 at one end of a crank 432 (Fig. 6) the other end of which is keyed, as at 434 to one end of a shaft 436. The shaft is journalled in a bearing 438 and is mounted for relative movement in sleeve 380. The shaft is provided adjacent its other end with a crank 440 (Fig. 4), keyed thereto as at 441, the free end of which is secured as at 442 to a link 444 (Figs. 4 and 8) which at its other end carries a pivot 446 which engages in a threader member 448. Said threader member is provided with the inwardly bent neck 450 of reduced width which is provided with the rearwardly extending threader head 452. The threader member 448 is pivotally mounted by means of the screw 454 to an intermediate plate or slide 456. It will be noted that the plate 456 is flanged as at 458 to slide over a stationary plate 460 carried by the base support 14. The intermediate plate 456 is mounted for vertical reciprocation on the stationary plate 460 being held thereagainst by a spacer 462. In this connection it will be noted that the stationary plate is provided with a longitudinally extending slot, as at 464, the screws 466 extending through said slot and interconnecting the spacer 462 and the intermediate plate 456 to provide for sliding engagement of the latter on the stationary plate. The threader member 448 is provided with an arcuate slot 468 through which the previously mentioned screw 454 extends whereby it will be understood that in addition to being pivotally movable relative to the intermediate plate 456, the threader member is also, to a limited extent, laterally movable relative thereto. In this connection it will be noted that a coiled spring member 470 carried on a spacer 472, which in turn is carried by the pin 446, has one end thereof, as at 474, secured to the slide 456, the other end thereof, as at 475, being secured to the threader member whereby the latter is biased in a clockwise direction, viewing Fig. 4. The stationary plate 460 is provided with a roller 476, and the threader member 448 is provided with a cam surface 478 which cooperates with said roller, as hereinafter described in detail.

From the foregoing it will be apparent that as the crank 440 rocks in a clockwise direction, viewing Fig. 4, it carries the link 444 in an upward direction and the latter, through the pin 446, moves both the threader member 448 and the intermediate plate or slide 456 upwardly on the stationary plate 460, the lowermost position of the various parts being illustrated in said figure.

Due to the provision of the cam surface 478 on the threader member 448, it will be apparent that said cam surface, cooperating with the roller 476, will cause the threader member to pivot in a counter-clockwise direction on the pin 446, viewing said figure, said counter-clockwise movement being facilitated by the previously mentioned slot 468 in said threader member. Fig. 19 illustrates the position of the parts as the cam surface 478 of the threader member is riding past the roller so that the roller will now ride on the side edge portion 480 of the threader member to complete the pivotal movement thereof from its initially angular position relative to the slide, as illustrated in Fig. 4, to a vertically disposed position thereof, as illustrated in Fig. 22. In order to retain said threader member in said vertically disposed position thereof, during the movement thereof, the slide is provided with a detent 482 which engages the side edge portion 484 of the threader member, as illustrated in Fig. 22. Therefore, it will be apparent that continued rotation of the crank 440 in the same direction will result in continued upward movement of the threader member in the vertically aligned position thereof, the uppermost position of said threader member being illustrated in Fig. 26. Due to the movement of the follower 428 in the opposite direction thereof, during the normal oscillatory movement thereof, the shaft 436 will now rock in the opposite direction whereby the various parts will move in the opposite direction from that previously described to return the threader member from the position thereof illustrated in Fig. 26 to the initial position thereof illustrated in Fig. 4.

Referring now to Figs. 14 through 27, it will be noted that as illustrated in Figs. 14 and 16, the shear 366 is the first to enter the loop L3, the threader member 448 beginning to move only after the shear is in position for the cutting action thereof. As illustrated in Fig. 17, it will be noted that the threader member 286 engages the loop L3 at one side thereof and the shear 366 engages the loop at the other side thereof. As the threader member 286 begins to withdraw, as illustrated in Fig. 20, the tension thereof on the loop is removed whereupon the loop tends to relax and spread as in said figure. The threader member 448 now begins to pivot into the loop due to the upward movement thereof which carries the cam portion 478 thereof past the stationary roller 476, as illustrated in Figs. 19 and 22. Fig. 19 illustrates the threader member 448 with the inturned head 452 thereof entering the loop while the neck 450 is spaced from the loop to prevent the binding thereof. The shear 366 now pivots downwardly to cut the loop at which time the threader member 448 assumes its upright position as shown in Fig. 22. Due to the fact that the head 452 of the threader member had entered the loop before the latter was cut, as illustrated in Fig. 20, it will be apparent that once the loop is cut the free end 486 thereof (Fig. 23) will fall onto the head 452. Thereafter, continued upward movement of the threader 448, which is now positioned in registry with the eyelet E2, will be effective to thread the tape portion 486 through said eyelet as illustrated in Fig. 27, from which it will be apparent that the adjustable strap, which has been severed from the fixed loop L1 and has been passed through the eyelet E1, is now threaded both through the eyelet E1 and the eyelet E2. The final threading operation now threads the adjustable tape strap through the eyelet E3.

A bracket 488 (Figs. 3 and 28) has a front leg 490 which is secured to the stationary slide frame 268, said bracket having a bottom cross portion 492 and an upstanding longer leg 494 which is spaced from said frame. Said upstanding leg 494 has a thicker portion 496 provided with a longitudinally extending slot 498 in which there is disposed a third threader 500 mounted for vertical reciprocation. Said leg 494 is provided with the cooperating meshed pinion gears 502 and 504. Gear 502 is keyed to a shaft 506 which is journalled for rotation in said leg 494. A link 508 is also keyed to said shaft 506. At its other end, said link is provided with a slot 510 in which there is received a pin 512 carried by the threader 500. The pinion 504 floats on a shaft 514 on which there floats the arm 516. The arm 516 traverses the path of movement of the tape withdrawing arm 176. The pinion 504 is provided with an arcuate slot 518 into which there extends a pin 520 carried by the arm 516. As the tape-drawing arm 176 begins to descend on the completion of the previously described threading operations, said arm engages the arm 516 and pivots the latter from the position thereof illustrated in Fig. 28 to the position thereof illustrated in Fig. 29 for rotating the pinion 504 in a clockwise direction. This results in the counter-clockwise rotation of the pinion 502 whereby the link 508 is pivoted downwardly against the bias of a spring 522 to carry the threader 500 through the eyelet E3 of the buckle for threading the ends of the adjustable strap therethrough as illustrated in Fig. 30. In this connection, it will be noted that when the threader 448 is retracted from the buckle eyelet L3, from the position thereof illustrated in Fig. 27, said strap ends will overlie said eyelet. The above described operation of the threader 500 completes the threading of the buckle. As the arm 176 continues to descend to the initial position thereof, as in Fig. 10, it will release the arm 516 whereby the spring 522, which is tied between link 508 and bracket 488, will be effective to retract the link to the position thereof illustrated in Fig. 28 and thereby return the arm 516 to the full line position thereof illustrated in Fig. 28. This of course causes the retraction of the threader 500 to enable the tape gripper 138 to pass over the threaded buckle for the start of the next cycle and also repositions the threader 500 for the next threading operation thereof. As arm 176 pivots upwardly, during the succeeding cycle of operation, said arm will engage the lower edge of arm 516 and carry the latter from the full line position thereof illustrated in Fig. 28 to the broken line position thereof illustrated in said figure. However, due to the lost motion connection constituted by the pin 520 and the slot 518, the pinion 504 will not be affected by said movement of the arm 516 and when said arm is released by the upward travel of the arm 176, the arm 516 will return by gravity to the full line position thereof illustrated in Fig. 28.

In using the apparatus of the present invention to thread the tape through the buckles, a supply of buckles is first transferred from the strip 236 onto the T-bar 214 by threading the lowermost buckles onto the T-bar, that is by inserting the upper end of the T-bar through the eyelets E3. Thereafter the lower end of the strip including the staples 238 is severed therefrom and all the buckles from the strip automatically thread onto the T-bar. With the ejector plate 208 in its initial retracted position, as indicated in Fig. 4, it will be apparent that the lowermost buckle will pass directly into the slideway 202 immediately in front of and in registry with the ejector plate. The leading end of the tape is then inserted into the tape-receiving device 48, being threaded through the cooperating plates 58 and 70 as illustrated in Fig. 6. For the very first cycle of operation, the plate 70 is depressed manually to bring the tape portion overlying the aperture 102 against the dispenser head 104 for applying a dab of adhesive or glue to the tape. It will be apparent that this is not necessary for succeeding cycles of operation in view of the fact that the plate 58 will be automatically depressed for this purpose. The switch 21 is then turned to close the circuit for operating the motor M. Referring now to Figs. 10 through 30 (Fig. 10 illustrating the condition of the apparatus prior to the start of the cycle) the ejector plate 208 will move forward from the position thereof illustrated in Fig. 4 to position the first buckle between the spaced buckle holders 224, as illustrated diagrammatically in Fig. 12. Simultaneously therewith, the tape gripper 138 moves forwardly to the position thereof illustrated in Fig. 11, the jaws 146 and 148 thereof opening to grasp the leading end of the tape, as illustrated in Figs. 9A through 9D, through the action of the jaw opening device 154. After the tape gripper 138 returns to the original position thereof carrying the tape over the roller 184 on the pivoted arm 176, the sleeve 288 begins to descend. The downwardly extending member 292 carried thereby pivots the depresser member 296 downwardly whereby the tape gripper 138 is pivoted downwardly about its pivot 136 causing the lower jaw arm 148 to engage the spring biased stop 330 for opening the jaws to release the leading edge of the tape therefrom. The shoe 326 carried at the end of the shaft 298 within the sleeve 288 now wedges the tape against the buckle holder 224. The arm 176 now begins to pivot upwardly so that the roller 184 thereof engages the undersurface of the tape to withdraw a predetermined length of tape from the supply thereof through the tape device 48, the tape being tensioned during said withdrawal by passing under the roller 328 and also by the pivotally mounted blade 80 in the device 48. Continued downward movement of the sleeve 288 carries the first threader 286 through the buckle eyelet E1 for forming the fixed loop L1. The ends of said loop are secured together when continued downward movement of the member 292 results in continued pivoting of the depresser member 296 until the portion 338 thereof engages the tape to force both ends of the loop L1 together against the threader 286 for adhesively securing said ends, as illustrated in Fig. 17. The tape having been threaded through the eyelet E1, there is also formed the loop L3, as illustrated in Fig. 17. The shear blade 364 and its companion shear 366 now begin to move forwardly from the position thereof illustrated in Fig. 14 until the shear 366 is inserted within the loop L3 as in Figs. 16 and 17, prior to performing the shearing operation through the loop L3. As illustrated in Fig. 18, the sleeve 288 now begins to retract to return the various parts carried thereby to their initial positions, this being accomplished by the expansion of the spring 320 which had contracted as a result of the downward movement of the sleeve. In this connection, it will be noted that the slide 266 is provided with a lateral extension 520 (Figs. 1 and 2) which upon upward movement of said slide, engages a laterally extending pin 522 carried by the depresser 296 as in Fig. 18, to provide an initial kick for rotating the depresser 296 back to a position where a spring 524 (Figs. 2 and 3) will be effective to carry the depresser back to its original position. Upon return of the depresser to its original position, the cam 144 carried by the shaft 24 will be effective to kick the gripper 138 upwardly to cooperate with the spring 140 to return said arm to its initial starting position. As the slide 266 returns to its raised position and carries the sleeve 288 back therewith, the threader 286 will be withdrawn from the loop L3, as illustrated in Fig. 20. Upon said withdrawal of the threader, loop L3 tends to expand to permit the entry therein of the head 452 of the threader member 448, as illustrated in Figs. 19 and 20. The shear 366 now pivots downwardly toward its companion shear blade 364 to cut the tape at the loop L3. As soon as said loop is cut, the threader head 452 moves into the position thereof illustrated in Fig. 22, whereby it is positioned to the left of the cut tape portion 486, said cut portion falling against the threader head, as illustrated in Fig. 23. The second threader 448 now begins to move upwardly, as illustrated in Fig. 23, to thread the tape portion 486 through the intermediate eyelet E2, as illustrated in Figs. 26 and 27. It will be noted that the shear 366 returns to the initial position thereof as the threader member 488 moves through the eyelet E2.

Simultaneously with the cutting of the withdrawn portion of the tape at the loop L3, the tape is also cut at the point where it passes from between the companion plates 70 and 58 of the device 48. Referring to Figs. 21 and 25, it will be noted that the stationary shear blade 424 is positioned to the left of the free end of said tape dispensing device 48, said shear blade underlying the path of withdrawal of the tape from the device 48, as illustrated in Fig. 11. The cooperating shear 420 pivots downwardly toward the shear member 424 to cut the tape at the point where it leaves the tape dispensing device 48, as illustrated in Figs. 24 and 25. The depresser bar or finger 426 carried by the shear 424 moves downwardly with the latter to engage the forward notched end of the lower plate 58 for pivoting the latter downwardly whereby to apply a dab of adhesive to the tape within the dispenser unit simultaneously with the cutting of the tape at the point where it leaves the dispenser unit.

The withdrawal of the threader member 448 from the eyelet E2, as illustrated in Fig. 27, causes the tape portion 486 to drape over the buckle and overlie the eyelet E3. The tape withdrawal arm 176 now begins to return to its initial position and in so doing engages the member 516 to rotate the pinion gear 504 in a clockwise direction, as illustrated in Fig. 28, whereby to rotate the cooperating pinion gear 502 in a counter-clockwise direction for inserting the third threader member 500 through the eyelet E3, as in Figs. 29 and 30, to complete the final threading operation, the completed threaded buckle being illustrated in Fig. 31. The apparatus now initiates its succeeding cycle of operation and the positioning of the next buckle to be threaded between the buckle holders 224 by the ejector plate 208 results in the automatic ejectment of the completed threaded buckle from the apparatus, as illustrated in Fig. 12.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. Buckle threading apparatus having a threading station, a holder for releasably retaining a buckle having at least a pair of openings therethrough in position at said threading station, means for withdrawing a length of tape from a supply thereof to said threading station, a first threader operable at said station in timed relation to said tape-withdrawing means for threading said length through one of said openings to form a loop, means operable in timed relation to said first threader for securing the ends of said loop, a first tape cutter operable in timed relation to said first threader plate to sever said loop from said tape length, a second threader operable in timed relation to said tape cutter to engage the leading portion of the severed tape length to thread the latter through said other opening, and a second tape cutter operable in timed relation to said first tape cutter to sever said tape length from said tape dispenser.

2. Buckle threading apparatus having a threading station, a holder for releasably retaining a buckle having at least a pair of openings therethrough in position at said threading station, a tape dispenser, means for withdrawing a length of tape from said dispenser to said threading station, a first threader operable at said station in timed relation to said tape-withdrawing means for threading said length through one of said openings to form a loop, means to apply an adhesive to said tape length, means operable in timed relation to said threader to seal the ends of said loop with said adhesive, a first tape cutter operable in timed relation to said first threader to sever said loop from said tape length, a second threader operable in timed relation to said tape cutter to engage the leading portion of the severed tape length to thread the latter through said other opening, and a second tape cutter operable in timed relation to said first tape cutter to sever said tape length from said tape dispenser, said adhesive applying means being operable in response to the operation of said second tape cutter.

3. Buckle threading apparatus having a threading station, a holder for releasably retaining a buckle having at least a pair of openings therethrough in position at said threading station, a tape dispenser, means for withdrawing a length of tape from said dispenser to said threading station, a first threader operable at said station in timed relation to said tape-withdrawing means for threading said length through one of said openings to form a loop, means for securing the ends of said loop, a first tape cutter operable in timed relation to said first threader to sever said loop from said tape length, a second threader operable in timed relation to said tape cutter to engage the leading portion of the severed tape length to thread the latter through said other opening, a second tape cutter operable in timed relation to said first tape cutter to sever said tape length from said tape dispenser, and an ejector operable in timed relation to said tape cutters to eject said buckle from said holder and to position another buckle therein at said threading station.

4. Buckle threading apparatus having a threading station, a holder for releasably retaining a buckle having at least an intermediate opening and a pair of outer openings therethrough in position at said threading station, a tape dispenser, means for withdrawing a length of tape from said dispenser to said threading station, a first threader operable at said station in timed relation to said tape-withdrawing means for threading said length through one of said outer openings to form a loop, means for securing the ends of said loop, a first tape cutter operable in timed relation to said first threader to sever said loop from said tape length, a second threader operable in timed relation to said tape cutter to engage the leading portion of the severed tape length to thread the latter through said intermediate opening, a second tape cutter operable in timed relation to said first tape cutter to sever said tape length from said tape dispenser, and a third threader operable in timed relation to said second tape cutter for threading said severed tape length through the other of said outer openings to form an adjustable strap in said buckle.

5. Buckle threading apparatus having a threading station, a holder for releasably retaining a buckle having at least an intermediate opening and a pair of outer openings therethrough in position at said threading station, a tape dispenser, means for withdrawing a length of tape from said dispenser to said threading station, a first threader operable at said station in timed relation to said tape-withdrawing means for threading said length through one of said outer openings to form a loop, means for securing the ends of said loop, a first tape cutter operable in timed relation to said first threader to sever said loop from said tape length, a second threader operable in timed relation to said tape cutter to engage the leading portion of the severed tape length to thread the latter through said intermediate opening, a second tape cutter operable in timed relation to said first tape cutter to sever said tape length from said tape dispenser, a third threader operable in timed relation to said second tape cutter for threading said severed tape length through the other of said outer openings to form an adjustable strap in said buckle, and an ejector operable in timed relation to said tape cutters to eject said buckle from said holder and to position another buckle therein at said threading station.

6. Buckle threading apparatus having a threading station, a holder for releasably retaining a buckle having an opening therethrough in position at said threading station, a member movable transversely of said holder for drawing the tape from a supply thereof to overlie the buckle, a wedge operable at said station to wedge the free end of the tape against said holder, means operable in timed relation to said wedge to withdraw a predetermined length of said tape from the tape supply, and a threader at said station in registry with said opening and operable transversely of the path of movement of said member and in timed relation therewith to thread the tape through said opening.

7. Buckle threading apparatus having a threading station, a holder for releasably retaining a buckle having at least an intermediate opening and a pair of outer openings therethrough in position at said threading station, a tape dispenser, a member movable transversely of said holder for drawing the tape from said dispenser to overlie the buckle, a wedge operable at said station to wedge the free end of the tape against said holder, means operable in timed relation to said wedge to withdraw a predetermined length of said tape from said dispenser, a first threader at said station in registry with and overlying one of said outer openings, said threader being operable transversely of the path of movement of said member and in timed relation therewith to thread the tape through said one outer opening to form a loop, means for securing the ends of said loop, a first tape cutter disposed below the buckle and operable in timed relation to said first threader to sever said loop from said tape length, a second threader disposed below said buckle and movable into registry with said intermediate opening, said second threader being operable transversely of the buckle and in timed relation to said first tape cutter to engage the leading portion of the severed tape length to thread the latter through said intermediate opening, a second tape cutter operable in timed relation to said first tape cutter to sever said tape length from said tape dispenser, and a third threader in registry with and overlying the other of said outer openings, said third threader being operable in timed relation to said second tape cutter for threading said severed tape length through said other of said outer openings to form an adjustable strap on said buckle.

8. Apparatus of the character described, comprising buckle holding means, means for automatically transferring a buckle from a supply thereof to said holding means, means operable in timed relation to said transferring means for automatically withdrawing a length of tape from a supply thereof, means operable in timed relation to said tape withdrawing means for automatically threading a portion of said withdrawn tape through the buckle to form a loop, and means operable in timed relation to said threading means for automatically severing said loop from said tape length.

9. Apparatus of the character described, comprising buckle holding means, means for automatically transferring a buckle from a supply thereof to said holding means, means operable in timed relation to said transferring means for automatically withdrawing a length of tape from a supply thereof, means operable in timed relation to said tape withdrawing means for automatically threading a portion of said withdrawn tape through the buckle to form a loop, means operable in timed relation to said threading means for mutually securing the ends of said loop, and means operable in timed relation to said securing means for severing said loop from said tape length.

10. An automatic buckle threading machine comprising a buckle holder, means for automatically transferring a buckle from a supply thereof to said holder, means for automatically applying a tape-securing agent to the leading portion of a tape extending from a supply thereof, means for automatically withdrawing said leading portion from the tape supply, means for automatically threading said withdrawn leading portion through the buckle to form a loop, means for securing the ends of said loop with said agent, means for severing said loop from the tape, and mechanism for operating all of the aforestated means in timed relation.

11. An automatic buckle threading machine comprising a buckle holder, means for automatically transferring a buckle from a supply thereof to said holder, means for automatically applying a tape-securing agent to the leading portion of a tape extending from a supply thereof, means for automatically withdrawing said leading portion from the tape supply, means for automatically threading said withdrawn leading portion through the buckle to form a loop, means for securing the ends of said loop with said agent, means for severing said loop from the tape, means for ejecting the threaded buckle from the holder, and mechanism for operating all of the aforestated means in timed relation.

12. Apparatus of the character described, comprising buckle holding means, means for automatically transferring a buckle from a supply thereof to said holding means, means operable in timed relation to said transferring means for automatically withdrawing a length of tape from a supply thereof, means operable in timed relation to said tape withdrawing means for automatically threading a portion of said withdrawn tape through the buckle to form a loop, means operable in timed relation to said threading means for mutually securing the ends of said loop, means operable in timed relation to said securing means for severing said loop from said tape length, and means for operating said transferring means in timed relation to said severing means to transfer another buckle from the buckle supply to said buckle holding means for ejecting the first mentioned buckle therefrom.

13. Apparatus of the character described, comprising means for releasably holding a buckle in position to be threaded, means for depositing a length of tape from a supply thereof in position at one side of the buckle, means operative in timed relation to said depositing means for releasably retaining the tape length in said position thereof, means operative at said buckle side and in timed relation to said retaining means for threading the tape through the buckle to form a loop, and mechanism operable in timed relation to said threading means for severing the loop from the tape length.

14. Apparatus of the character described, comprising means for releasably holding a buckle in position to be threaded, means for depositing a length of tape from a supply thereof in position at one side of the buckle, means operative in timed relation to said depositing means for releasably retaining the tape length in said position thereof, means operative at said buckle side and in timed relation to said retaining means for threading the tape through the buckle to form a loop, mechanism operable in timed relation to said threading means for severing the loop from the tape length, and means operable in timed relation to said severing means for ejecting the threaded buckle from said holding means.

15. Apparatus of the character described, comprising a buckle holder for releasably holding a buckle having a pair of eyelets in a position to be threaded, means for withdrawing a length of tape from a supply thereof, means for threading a portion of said tape length through one of said eyelets to form a loop, means for severing said loop from said tape length, means for threading the remainder of said tape length through the other of said eyelets to form a second loop, means for severing said tape remainder from said tape supply and mechanism for operating all of the aforestated means in timed relation.

16. Apparatus of the character described, comprising a buckle holder for releasably holding a buckle having a pair of eyelets in a position to be threaded, means for automatically positioning a buckle in said holder from a supply thereof, means for withdrawing a length of tape from a supply thereof, means for threading a portion of said tape length through one of said eyelets to form a loop, means for mutually securing the ends of said loop, means for severing said loop from said tape length, means for threading the remainder of said tape length through the other of said eyelets to form a second loop, means for severing said tape remainder from said tape supply, and mechanism for operating all of the aforestated means in timed relation.

17. Apparatus of the character described, comprising a buckle holder for releasably holding a buckle having a pair of eyelets in a position to be threaded, means for withdrawing a length of tape from a supply thereof to a position at one side of said buckle, means operable at said buckle side to thread the leading portions of the tape length through one of said eyelets to form a loop, means for severing said loop from said tape length, means operable at the other side of said buckle to thread the remainder of said tape length through the other of said eyelets to form a second loop, means for severing said tape remainder from said tape supply, and mechanism for operating all of the aforestated means in timed relation.

18. Apparatus of the character described comprising a buckle holder for releasably holding a buckle having a pair of eyelets in a position to be threaded, means for automatically transferring a buckle from a supply thereof to said holder, means operable in timed relation to said transfer means for withdrawing a length of tape from a supply thereof to a position at one side of said buckle, means operable at said buckle side and in timed relation to said withdrawing means for threading the leading portion of the tape length through one of said eyelets to form a loop, means operable in timed relation to said threading means for mutually securing the ends of said loop, means operable in timed relation to said securing means for severing said loop from said tape length, means operable at the other side of said buckle and in timed relation to said severing means for threading the remainder of said tape length through the other of said eyelets to form a second loop, means operable in timed relation to said latter threading means for severing said tape remainder from the tape supply, and means for operating said transferring means in timed relation to said latter severing means to transfer another buckle to said buckle holder for ejecting the first mentioned buckle therefrom.

19. Apparatus of the character described comprising a buckle holder for releasably holding a buckle having a pair of eyelets in a position to be threaded, means for withdrawing a length of tape from a supply thereof to a position overlying said buckle, means for releasably retaining the leading end of said tape length in said position thereof, means operable from a position above said buckle to thread a portion of said tape length downwardly through one of said eyelets to form a loop, means for mutually securing the ends of said loop means for severing said loop from said tape length, means operable from a position below said buckle to thread upwardly through said other eyelet the portion of said tape length severed from said loop and extending through said one eyelet to form a second loop, means for severing said tape length from the tape supply, and mechanism for operating all of said means in timed relation.

20. Apparatus of the character described, comprising a buckle holder for releasably holding a buckle having an intermediate and two outer eyelets in a position to be threaded, means for withdrawing a length of tape from a supply thereof, means for threading a portion of said tape length through one of the outer eyelets to form a first loop, means for severing said loop from said tape length, means for threading the remainder of said tape length through the intermediate eyelet, and through the other outer eyelet to form an adjustable loop, means for severing the remainder of the tape length from the tape supply, and mechanism for operating all of said means in timed relation.

21. Apparatus of the character described, comprising a buckle holder for releasably holding a buckle having an intermediate and two outer eyelets in a position to be threaded, means for withdrawing a length of tape from a supply thereof, means for threading a portion of said tape length through one of the outer eyelets to form a first loop, means for mutually securing the ends of said loop, means for severing said loop from said tape length, means for threading the remainder of said tape length through the intermediate eyelet and through the other outer eyelet to form an adjustable loop, means for severing the remainder of the tape length from the tape supply, and mechanism for operating all of said means in timed relation.

22. Apparatus of the character described, comprising a buckle holder for releasably holding a buckle having an intermediate and two outer eyelets in a position to be threaded, means for withdrawing a length of tape from a supply thereof, to a position at one side of said buckle, means operable at said buckle side to thread the leading portion of the tape length through one of the outer eyelets to form a first loop, means for severing said loop from the tape length, means operable at the other side of the buckle to thread the remainder of the tape length through the intermediate eyelet, means operable at the first mentioned buckle side for threading the remainder of the tape length through the other outer eyelet to form an adjustable loop, means for severing the tape remainder from the tape supply, and mechanism for operating all of said means in timed relation.

23. Apparatus of the character described, comprising a buckle holder for releasably holding a buckle having an intermediate and two outer eyelets in a position to be threaded, means for transferring the buckle from a supply thereof to said holder, means for withdrawing a length of tape from a supply thereof to a position overlying the buckle, means operable from a position above the buckle for threading a portion of the tape length downwardly through one of the outer eyelets to form a first loop, means for mutually securing the ends of the loop, means for severing the loop from the tape length, means operable from a position below the buckle for threading upwardly through the intermediate eyelet the portion of the tape length severed from the loop and extending through said one outer eyelet, means operable from a position above the buckle for threading the remainder of the tape length downwardly through the other outer eyelet to form an adjustable strap, means for severing the strap from the tape supply, and mechanism for operating all of said means in timed relation.

24. Apparatus of the character described, comprising a buckle holder for releasably holding a buckle having an intermediate and two outer eyelets in a position to be threaded, means for transferring the buckle from a supply thereof to said holder, means for withdrawing a length of tape from a supply thereof to a position overlying the buckle, means for releasably retaining the leading end of the tape length in said position, means operable from a position above the buckle for threading a portion of the tape length downwardly through one of the outer eyelets to form a first loop, means for mutually securing the ends of the loop, means for severing the loop from the tape length, means operable from a position below the buckle for threading upwardly through the intermediate eyelet the portion of the tape length severed from the loop and extending through said one outer eyelet, means operable from a position above the buckle for threading the remainder of the tape length downwardly through the other outer eyelet to form an adjustable strap, means for severing the strap from the tape supply, and mechanism for operating all of said means in timed relation.

25. In a buckle threading apparatus, a threading station constituted by buckle holding means and buckle threading means mounted for relative movement, means for mounting a supply of buckles, means for advancing a buckle from said supply to said holding means, means operable in timed relation to said buckle advancing means for depositing a length of tape at said station, and means for operating said threading means in timed relation to said tape depositing means to thread said length of the tape through said buckle.

26. In a buckle threading apparatus, a threading station constituted by buckle holding means and buckle threading means mounted for relative movement, means for mounting a supply of buckles, means for advancing a buckle from said supply to said holding means, tape dispenser means, means operable in timed relation to said buckle advancing means for depositing a length of tape from said dispenser at said station, means for operating said threading means in timed relation with said tape depositing means for threading the length of tape through the buckle to form a loop, and means operable in timed relation to said threading means to seal the ends of the loop.

27. In a buckle threading apparatus, a threading station constituted by buckle holding means and buckle threading means mounted for relative movement, means for mounting a supply of buckles, means for advancing a buckle from said supply to said holding means, tape dispenser means, means operable in timed relation to said buckle advancing means for depositing a length of tape from said dispenser at said station, means for operating said threading means in timed relation with said tape depositing means for threading the length of tape through the buckle to form a loop, and means operable in timed relation to said threading means to seal the ends of the loop, and means operable in timed relation to said sealing means to sever the loop from said tape length.

28. In a buckle threading apparatus, a threading station constituted by buckle holding means and buckle threading means mounted for relative movement, means for mounting a supply of buckles, means for advancing a buckle from said supply to said holding means, tape dispenser means, means operable in timed relation to said buckle advancing means for depositing a length of tape from said dispenser at said station, means for operating said threading means in timed relation with said tape depositing means for threading the length of tape through the buckle to form a loop, and means operable in timed relation to said threading means to seal the ends of the loop, and means operable in timed relation to said sealing means to sever the loop from said tape length, and means for operating said buckle advancing means in timed relation to said severing means to advance another buckle to said holding means for ejecting the first mentioned buckle therefrom.

29. In a buckle threading apparatus, a threading station constituted by buckle holding means and buckle threading means mounted for relative movement, means for mounting a supply of buckles, means for advancing a buckle from said supply to said holding means, tape dispenser means, means operable in timed relation to said buckle advancing means for depositing a length of tape from said dispenser at said station, means for operating said threading means in timed relation with said tape depositing means for threading the length of tape through the buckle to form a loop, a dispenser for applying an adhesive to the tape, and means operable in timed relation to said threading means to seal the ends of said loop with said adhesive, said threader operating means being operable to dispose said threading means as a backing for said loop during the operation of the sealing means to facilitate said sealing of the loop.

30. In a buckle threading apparatus, holder means for releasably retaining a buckle in position to be threaded, a tape dispenser spaced from said holder, means operable between said holder and said dispenser for withdrawing a length of said tape from said dispenser to said holder means, threader means operable to thread said length through the buckle to form a loop therein, and mechanism to operate said withdrawing means and said threader in timed relation.

31. In a buckle threading apparatus, holder means for releasably retaining a buckle in position to be threaded, a tape dispenser spaced from said holder, means operable between said holder and said dispenser for withdrawing a length of said tape from said dispenser to said holder means, threader means operable to thread said length through the buckle to form a loop therein, and mechanism to operate said withdrawing means and said threader in timed relation, and means operable in timed relation to said threader means to sever the loop from the balance of the tape.

32. In a buckle threading apparatus, holder means for releasably retaining a buckle in position to be threaded, a tape dispenser spaced from said holder, means operable between said holder and said dispenser for withdrawing a length of said tape from said dispenser to said holder means, means for releasably retaining said tape length at said holder means, means for threading said length through the buckle to form a loop therein, and mechanism to operate said withdrawing means, said retaining means and said threading means in timed relation.

33. In a buckle threading apparatus, holder means for releasably retaining an apertured buckle in position to be threaded, a tape dispenser spaced from said holder, a member mounted for movement between said dispenser and said holder and transversely of the latter for withdrawing the tape from said dispenser to overlie the buckle, a threader disposed in registry with the aperture of a buckle positioned in the holder means and mounted for movement in a direction transversely of the path of movement of said withdrawing member, and mechanism to operate said withdrawing member and said threader in timed relation.

34. In a buckle threading apparatus, a threading station constituted by a buckle holding means and buckle threading means mounted for relative movement, means for advancing buckles to said holding means, means operable in timed relation to said buckle advancing means for advancing a length of tape from a supply thereof to said station, means for operating said threading means in timed relation to said tape advancing means to thread said length of tape through said buckle, and means operable in timed relation to said threading means for severing said length of tape from the supply thereof.

35. Buckle threading apparatus having a threading station, a holder for releasably retaining a buckle having an opening therethrough in position at said threading station, means for advancing a length of tape to a position at one side of said buckle, means operable at said station in timed relation to said tape advancing means to hold said length of tape in said position, and a threader at said station in registry with said opening and operable transversely of the path of movement of said length of tape and in timed relation with said advancing means to thread the tape through said opening.

36. Buckle threading apparatus having a threading station, a holder for releasably retaining a buckle having an opening therethrough in position at said threading station, means for advancing a length of tape from a supply thereof to a position at one side of said buckle, means operable at said station in timed relation to said tape advancing means to hold said length of tape in said position, a threader at said station in registry with said opening and operable transversely of the path of movement of said length of tape and in timed relation with said advancing means to thread the tape through said opening, and means operable in timed relation with said threader for severing said length of tape from the supply thereof.

37. Buckle threading apparatus having a threading station, a holder for releasably retaining in position at said station a buckle having an intermediate eyelet and two outer eyelets, means for advancing a length of tape from a supply thereof to a position across the buckle eyelets, means operable at said station in timed relation to said tape advancing means to hold said length of tape in said position, three threaders mounted for reciprocation at said station in registry with the buckle eyelets, respectively, the threaders associated with the outer eyelets being operable from one side of the buckle and the threader associated with the intermediate eyelet being operable from the other side of the buckle and means for operating said threaders in timed relation with each other and with said tape advancing means to thread the tape through the buckle eyelets.

38. Buckle threading apparatus having a threading station, a holder for releasably retaining in position at said station a buckle having an intermediate eyelet and two outer eyelets, means for advancing a length of tape from a supply thereof to a position across the buckle eyelets, means operable at said station in timed relation to said tape advancing means to hold said length of tape in said position, three threaders mounted for reciprocation at said station in registry with the buckle eyelets, respectively, the threaders associated with the outer eyelets being operable from one side of the buckle and the threader associated with the intermediate eyelet being operable from the other side of the buckle, means for operating said threaders in timed relation with each other and with said tape advancing means to thread the tape through the buckle eyelets, and means operable in timed relation with said threaders to sever said length of tape from the supply thereof.

References Cited in the file of this patent

UNITED STATES PATENTS

| | | |
|---|---|---|
| 888,539 | Simpson | May 26, 1908 |
| 1,867,077 | Joyce et al. | July 12, 1932 |
| 2,114,795 | Chabon | Apr. 19, 1938 |
| 2,274,795 | Klock et al. | Mar. 3, 1942 |
| 2,327,291 | Shaulson | Sept. 17, 1943 |
| 2,374,717 | Alfandre | May 1, 1945 |
| 2,455,545 | Alfandre | Dec. 7, 1948 |